United States Patent
Saito et al.

(10) Patent No.: US 11,709,362 B2
(45) Date of Patent: Jul. 25, 2023

(54) METHOD FOR MANUFACTURING OPTICAL ELEMENT, OPTICAL ELEMENT AND DISPLAY DEVICE

(71) Applicant: SEIKO EPSON CORPORATION, Tokyo (JP)

(72) Inventors: Atsushi Saito, Chino (JP); Hiroyuki Tatsugi, Chino (JP); Toshiyuki Noguchi, Shiojiri (JP)

(73) Assignee: SEIKO EPSON CORPORATION, Tokyo (JP)

( * ) Notice: Subject to any disclaimer, the term of this patent is extended or adjusted under 35 U.S.C. 154(b) by 317 days.

(21) Appl. No.: 17/001,700

(22) Filed: Aug. 25, 2020

(65) Prior Publication Data
US 2021/0063747 A1  Mar. 4, 2021

(30) Foreign Application Priority Data
Aug. 28, 2019  (JP) .................. 2019-156027

(51) Int. Cl.
*G02B 27/01* (2006.01)
*G03H 1/02* (2006.01)

(52) U.S. Cl.
CPC ....... *G02B 27/0172* (2013.01); *G03H 1/0272* (2013.01); *G02B 2027/0174* (2013.01); *G03H 2250/10* (2013.01); *G03H 2270/14* (2013.01); *G03H 2270/21* (2013.01)

(58) Field of Classification Search
CPC ........ G02B 27/0172; G02B 2027/0174; G02B 2027/0192; G02B 2027/0194; G02B 2027/0196; G02B 2027/0198; G02B 2027/0109; G02B 5/32; G03H 1/0272; G03H 1/02; G03H 1/0402; G03H 2250/00; G03H 2250/10; G03H 2270/00;
(Continued)

(56) References Cited

U.S. PATENT DOCUMENTS 4,990,415 A * 2/1991 Yu .................. G03H 1/18
430/258
5,499,117 A * 3/1996 Yin .................. G03H 1/02
430/1
(Continued)

FOREIGN PATENT DOCUMENTS

CN  1755527  4/2006
CN  103472703  12/2013
(Continued)

*Primary Examiner* — Stephone B Allen
*Assistant Examiner* — Jyotsna V Dabbi
(74) *Attorney, Agent, or Firm* — JCIPRNET

(57) ABSTRACT

A method of manufacturing an optical element including, a first step of, after affixing a hologram forming material to a glass substrate having a marking portion, performing interference exposure on the hologram forming material, thereby forming a hologram layer at the glass substrate, and a second step of affixing the hologram layer peeled off from the glass substrate to a plastic substrate having a first alignment mark, wherein in the second step, the first alignment mark on the plastic substrate, and a second alignment mark formed at a position corresponding to the marking portion in the hologram layer during the interference exposure are used to implement positioning of the plastic substrate and the hologram layer.

8 Claims, 13 Drawing Sheets

(58) Field of Classification Search
CPC .......... G03H 2270/11; G03H 2270/14; G03H 2270/21; G03H 2270/55
USPC ........................................................ 359/13
See application file for complete search history.

(56) References Cited

U.S. PATENT DOCUMENTS

| | | | |
|---|---|---|---|
| 2002/0003637 A1* | 1/2002 | Watanabe | G03H 1/0005 |
| | | | 359/22 |
| 2006/0068305 A1 | 3/2006 | Iriguchi | |
| 2010/0104952 A1 | 4/2010 | Azakami et al. | |
| 2014/0240805 A1 | 8/2014 | Azakami et al. | |
| 2015/0260994 A1 | 9/2015 | Akutsu et al. | |
| 2016/0202485 A1 | 7/2016 | Yamada | |
| 2017/0060087 A1 | 3/2017 | Azakami et al. | |
| 2017/0261751 A1* | 9/2017 | Noguchi | G02B 5/1842 |
| 2018/0239150 A1* | 8/2018 | Yoshida | G02B 27/0172 |
| 2019/0235266 A1 | 8/2019 | Ide et al. | |
| 2021/0149209 A1 | 5/2021 | Ide et al. | |

FOREIGN PATENT DOCUMENTS

| | | | | |
|---|---|---|---|---|
| CN | 110082926 | | 8/2019 | |
| JP | 2015175967 | | 10/2015 | |
| JP | 2016128861 | | 7/2016 | |
| JP | 2016188905 | | 11/2016 | |
| JP | 2016188906 | | 11/2016 | |
| JP | 2016188906 A | * | 11/2016 | ............... G02B 5/32 |
| JP | 2017167181 | | 9/2017 | |

* cited by examiner

METHOD FOR MANUFACTURING OPTICAL ELEMENT, OPTICAL ELEMENT AND DISPLAY DEVICE

The present application is based on, and claims priority from JP Application Serial Number 2019-156027, filed Aug. 28, 2019, the disclosure of which is hereby incorporated by reference herein in its entirety.

BACKGROUND

1. Technical Field

The present disclosure relates to a method for manufacturing an optical element, the optical element, and a display device.

2. Related Art

As a display device including a diffraction element such as a holographic element, a display device has been proposed in which imaging light emitted from an imaging light generating device is deflected toward an eye of an observer by a diffraction element. Interference fringes are optimized in the diffraction element to obtain an optimum diffraction angle and optimum diffraction efficiency at a specific wavelength. However, the imaging light has a predetermined spectral width centered at a specific wavelength, and thus, light with a peripheral wavelength deviated from the specific wavelength may cause a decrease in resolution of an image. Thus, a display device has been proposed in which imaging light emitted from an imaging light generating device is directed by a first diffraction element of a reflection-type toward a second diffraction element disposed in front of the first diffraction element and in which the second diffraction element deflects, toward an eye of an observer, the imaging light emitted from the first diffraction element. According to the configuration, the first diffraction element can perform wavelength compensation, and a decrease in resolution of an image due to light having a peripheral wavelength deviated from a specific wavelength may be suppressed (see JP-A-2017-167181).

In the first diffraction element and the second diffraction element described above, a hologram layer having interference fringes is formed by performing interference exposure using laser light with a hologram material affixed to a substrate. The hologram material warps together with the substrate due to expansion and contraction occurring during the interference exposure. When the warping occurs during the interference exposure in this way, the interference exposure is performed in the warped state, and desired interference fringes cannot be formed, and desired diffraction performance cannot be obtained. Thus, while it is conceivable to support the hologram material with a glass substrate having a high elastic modulus, there arises a possibility in that the glass substrate may be broken, or a problem in that weight of the device may increase.

SUMMARY

In order to solve the problem described above, a method for manufacturing an optical element according to an aspect of the present disclosure includes, a first step of performing, after affixing a hologram forming material to a glass substrate having a marking portion, interference exposure on the hologram forming material, thereby forming a hologram layer at the glass substrate, and a second step of affixing the hologram layer, peeled off from the glass substrate, to a plastic substrate having a first alignment mark, wherein the second step includes using the first alignment mark on the plastic substrate, and a second alignment mark formed at a position corresponding to the marking portion in the hologram layer during the interference exposure to implement positioning of the plastic substrate and the hologram layer.

A method for manufacturing may be adopted in which the first step includes affixing the hologram forming material to a second surface of the glass substrate opposite to a first surface thereof at which the marking portion is formed.

A method for manufacturing may be adopted in which, at the glass substrate, the marking portion is provided at a position, at which the second alignment mark is formed, outside an optically effective region in the hologram layer.

A method for manufacturing may be adopted in which the second step includes using the plastic substrate at which the first alignment mark is disposed at a position in consideration of shift of an exposure position at the first alignment mark from the marking portion.

A method for manufacturing may be adopted in which the second step includes bonding the plastic substrate and the hologram layer to each other via an adhesive.

A method for manufacturing may be adopted in which, the glass substrate and the plastic substrate each have a curved shape.

A method for manufacturing may be adopted in which the first step includes using reference light and object light, which are composed of spherical waves, to perform the interference exposure on the hologram forming material.

A method for manufacturing an optical element according to a first aspect of the present disclosure includes, a first step of performing, after affixing a first hologram forming material to a glass substrate having a marking portion, interference exposure on the first hologram forming material, thereby forming a first hologram layer at the glass substrate, and a second step of affixing the first hologram layer, peeled off from the glass substrate, to a plastic substrate having a first alignment mark, a third step of performing, after affixing a second hologram forming material to the glass substrate, interference exposure on the second hologram forming material, thereby forming a second hologram layer at the glass substrate, and a fourth step for overlapping and affixing the second hologram layer, peeled off from the glass substrate, to the first hologram layer affixed to the plastic substrate, wherein the second step includes using the first alignment mark at the plastic substrate, and a second alignment mark formed at a position corresponding to the marking portion in the first hologram layer during the interference exposure in the first step to implement positioning of the plastic substrate and the first hologram layer.

A method for manufacturing an optical element according to a second aspect of the present disclosure includes, a first step of performing, after affixing a first hologram forming material to a glass substrate having a marking portion, interference exposure on the first hologram forming material, thereby forming a first hologram layer at the glass substrate, a second step of performing, after affixing a second hologram forming material to the first hologram layer, interference exposure on the second hologram forming material, thereby forming a second hologram layer at the first hologram layer, and a third step of affixing a laminated body of the first hologram layer and the second hologram layer, peeled off from the glass substrate, to a plastic substrate having a first alignment mark, wherein the third step includes using the first alignment mark on the plastic substrate, and at least one of a second alignment mark formed at a position corresponding to the marking portion in the first hologram layer in the first step and a third alignment mark formed at a position corresponding to the marking portion in the second hologram layer in the second step to implement positioning of the plastic substrate and the laminated body.

An optical element according to a third aspect of the present disclosure includes a plastic substrate having a first alignment mark, and a hologram layer affixed to the plastic substrate, and having a second alignment mark exposed together with interference fringes, wherein, in order for the first alignment mark and the second alignment mark to have a predetermined positional relationship therebetween, the plastic substrate and the hologram layer are affixed to each other.

A display device according to a fourth aspect of the present disclosure includes an imaging light generating device configured to generate imaging light, and an optical system including a diffraction element configured to diffract the imaging light emitted from the imaging light generating device, wherein the diffraction element is constituted of the optical element according to the third aspect.

DESCRIPTION OF EXEMPLARY EMBODIMENTS

First Exemplary Embodiment

Exemplary embodiments of the present disclosure will be described below with reference to the accompanying drawings. Note that, in each of the drawings below, to make each of layers and each of members a recognizable size, each of the layers and each of the members are illustrated to be different from an actual scale and an actual angle.

Figure 1:
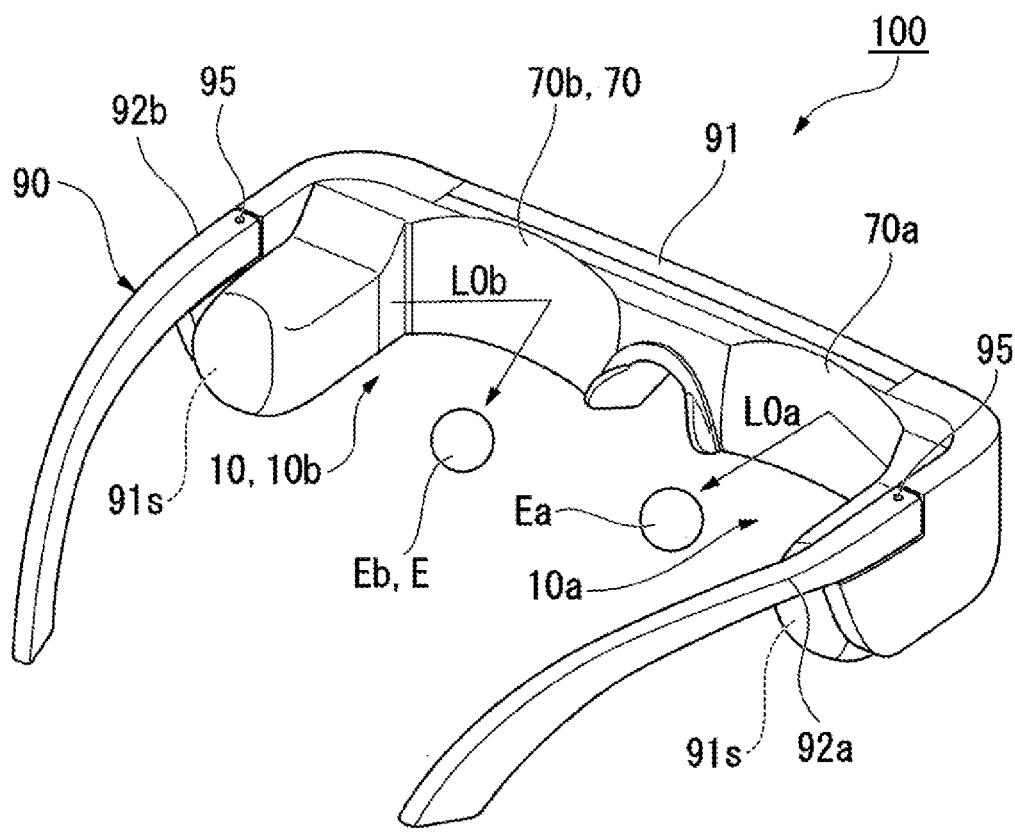
FIG. 1 is an external view illustrating one aspect of a visual appearance of a display device according to a first exemplary embodiment.
Figure 1:
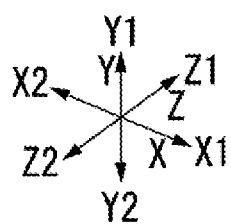
Figure 2:
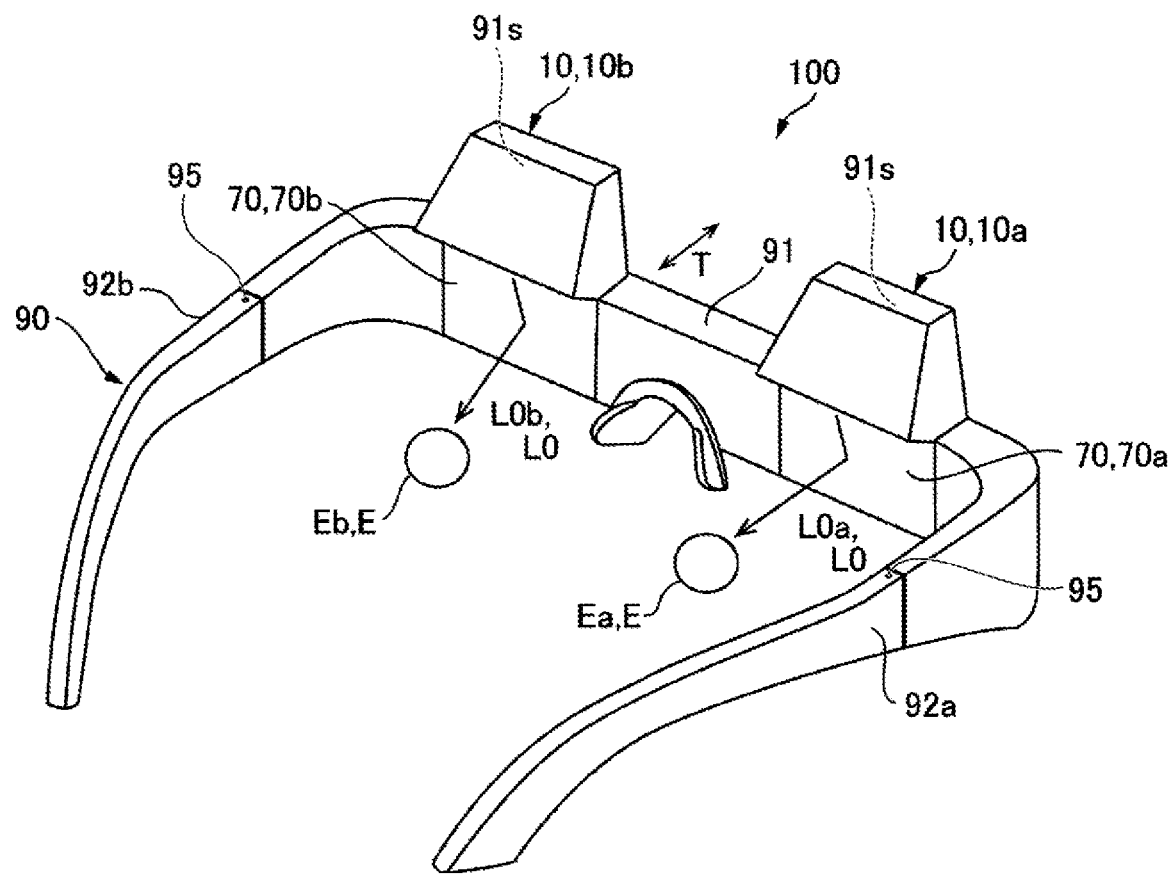
FIG. 2 is an external view illustrating an aspect of another visual appearance of the display device.
Figure 3:
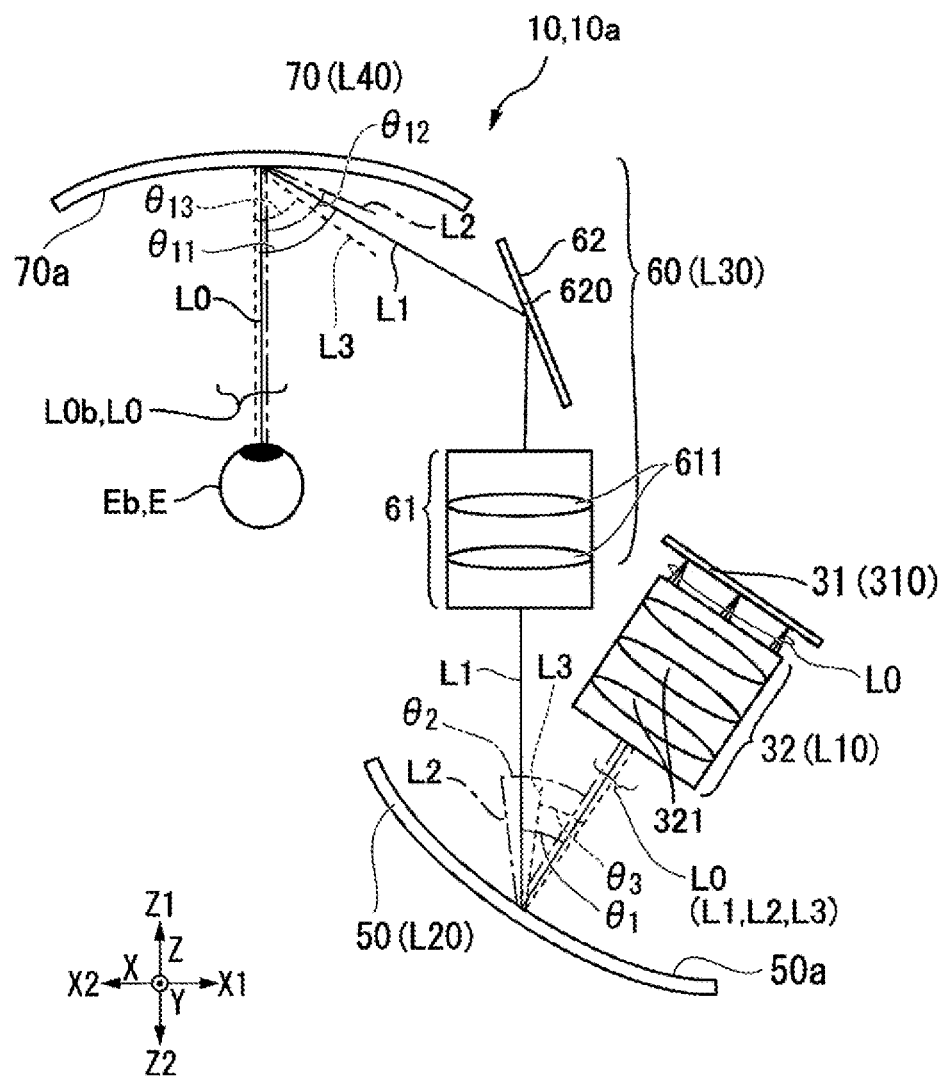
FIG. 3 is an explanatory diagram illustrating an aspect of an optical system of the display device.

FIG. 1 is an external view illustrating an aspect of a visual appearance of a display device 100 according to the present exemplary embodiment. FIG. 2 is an external view illustrating an aspect of another visual appearance of the display device 100. FIG. 3 is an explanatory diagram illustrating an aspect of an optical system 10 of the display device 100 illustrated in FIG. 1. Note that, in FIG. 1 to FIG. 3, a front-back direction relative to an observer wearing the display device is referred to as a direction along a Z-axis, a front of the observer wearing the display device as one side in the front-back direction is referred to as a front side Z1, and a back of the observer wearing the display device as another side in the front-back direction is referred to as a back side Z2. A left and right direction with respect to the observer wearing the display device is defined as a direction along an X-axis, one side in the left and right direction corresponding to the right direction of the observer wearing the display device is defined as a right side X1, and the other side in the left and right direction corresponding to the left direction of the observer wearing the display device is defined as a left side X2. An up and down direction with respect to the observer wearing the display device is defined as a direction along a Y-axis, one side in the up and down direction corresponding to the up direction of the observer wearing the display device is defined as an up side Y1, and the other side in the up and down direction corresponding to the down direction of the observer wearing the display device is defined as a down side Y2.

The display device 100 illustrated in FIG. 1 is a head-mounted display device, and includes a right-eye optical system 10a that causes imaging light L0a to be incident on a right eye Ea and a left-eye optical system 10b that causes imaging light L0b to be incident on a left eye Eb. For example, the display device 100 is formed in a shape like glasses. Specifically, the display device 100 further includes a housing 90 that holds the right-eye optical system 10a and the left-eye optical system 10b. The display device 100 is mounted to the head of the observer by the housing 90.

In the display device 100, the housing 90 includes a frame 91, a temple 92a provided on the right side of the frame 91 and locked on the right ear of the observer, and a temple 92b provided on the left side of the frame 91 and locked on the left ear of the observer. The frame 91 includes storage spaces 91s on both sides of the frame 91, and the storage spaces 91s house components such as an imaging light projecting device that constitute the optical system 10 described below. The temples 92a and 92b are foldably coupled to the frame 91 by hinges 95.

The right-eye optical system 10a and the left-eye optical system 10b have the same basic configuration. Therefore, the right-eye optical system 10a and the left-eye optical system 10b will be described as the optical system 10 without distinction in the description below.

In the display device 100 illustrated in FIG. 1, imaging light L0 is caused to travel in the left and right direction along the X-axis. However, as illustrated in FIG. 2, the imaging light L0 may be caused to travel from the up side Y1 to the down side Y2 and leave the display device 100 and enter the eye E of the observer, or the optical system 10 may be disposed to span the top of the head and the front of the eye E.

A basic configuration of the optical system 10 of the display device 100 will be described with reference to FIG. 3. FIG. 3 is an explanatory diagram illustrating an aspect of an optical system 10 of the display device 100 illustrated in FIG. 1. Note that FIG. 3 also illustrates, in addition to light L1 (solid line) with a specific wavelength of the imaging light L0, light L2 (dot-and-dash line) on a long wavelength side and light L3 (dotted line) on a short wavelength side with respect to the specific wavelength.

As illustrated in FIG. 3, in the optical system 10, a first optical unit L10, a second optical unit L20, a third optical unit L30, and a fourth optical unit L40 are arranged along a traveling direction of the imaging light L0 emitted from the imaging light generating device 31; the first optical unit L10 has positive power, the second optical unit L20 has positive power, the third optical unit L30 has positive power, and the fourth optical unit L40 has positive power.

In the present exemplary embodiment, the first optical unit L10 having positive power is constituted of a projection optical system 32. The second optical unit L20 having positive power is constituted of a first diffraction element 50 of a reflection-type. The third optical unit L30 having positive power is constituted of a light-guiding system 60. The fourth optical unit L40 having positive power is constituted of a reflection-type second diffraction element 70. In the present exemplary embodiment, the first diffraction element 50 and the second diffraction element 70 are reflection-type diffraction elements.

In the optical system 10, with a focus on the traveling direction of the imaging light L0, the imaging light generating device 31 emits the imaging light L0 toward the projection optical system 32, the projection optical system 32 emits the incident imaging light L0 toward the first diffraction element 50, and the first diffraction element 50 emits the incident imaging light L0 toward the light-guiding system 60. The light-guiding system 60 emits the incident imaging light L0 toward the second diffraction element 70, and the second diffraction element 70 emits the incident imaging light L0 toward the eye E of the observer.

In the present exemplary embodiment, the imaging light generating device 31 generates the imaging light L0.

An aspect may be adopted where the imaging light generating device 31 includes a display panel 31a such as an organic electroluminescent display element. The aspect can provide the display device 100 that is small-sized and capable of displaying a high-quality image. Also, an aspect may be adopted where the imaging light generating device 31 includes an illumination light source (not illustrated) and the display panel 31a such as a liquid crystal display element that modulates illumination light emitted from the illumination light source. The aspect allows the illumination light source to be selected. Thus, the aspect has an advantage of increasing a degree of flexibility in a wavelength characteristic of the imaging light L0. Herein, an aspect may be adopted where the imaging light generating device 31 includes one number of the display panel 31a that enables color display. Another aspect may be adopted where the imaging light generating device 31 includes a plurality of display panels 31a corresponding to respective colors, and a synthesis optical system that synthesizes imaging light in respective colors emitted from the plurality of display panels 31a. Furthermore, an aspect may be adopted where the imaging light generating device 31 modulates laser light using a micro-mirror device.

The projection optical system 32 is an optical system for projecting the imaging light L0 generated by the imaging light generating device 31, and is constituted by a plurality of lenses 32a. In FIG. 3, a case is exemplified in which the projection optical system 32 includes three number of the lenses 32a, but the number of lenses 32a is not limited thereto, and the projection optical system 32 may include four or more number of the lenses 32a. Further, the lenses 32a may be bonded to each other to form the projection optical system 32. Further, the lens 32a may be constituted of a lens with a free form surface.

The light-guiding system 60 includes a lens system 61 on which the imaging light L0 emitted from the first diffraction element 50 is incident, and a mirror 62 that emits the imaging light L0 emitted from the lens system 61 in an obliquely inclined direction. The lens system 61 includes a plurality of lenses 611 disposed in the front-back direction along the Z-axis. The mirror 62 includes a reflective surface 620 inclined diagonally to the front-back direction. In the present exemplary embodiment, the mirror 62 is a total reflection mirror. However, the mirror 62 may be a half mirror, and in this case, a range in which outside light is visible can be widened.

Now, a configuration of the first diffraction element 50 and the second diffraction element 70 will be described.

In the present exemplary embodiment, the first diffraction element 50 and the second diffraction element 70 have the same basic configuration. Hereinafter, a configuration of the second diffraction element 70 will be described as an example.

The second diffraction element 70 (optical element) is a reflection-type volume holographic element. The second diffraction element 70 constitutes a partial transmissive reflective combiner. Therefore, outside light is incident on the eye E via the second diffraction element 70, and thus the observer can recognize an image in which the imaging light L0 formed by the imaging light generating device 31 and the outside light (background) are superimposed on each other.

As illustrated in FIG. 3, the second diffraction element 70 faces the eye E of the observer, and an incident surface 70a of the second diffraction element 70 on which the imaging light L0 is incident has a concave curved surface shape being recessed in a direction away from the eye E. In other words, the incident surface 70a has a shape having a central portion recessed and curved with respect to a peripheral portion in an incident direction of the imaging light L0. Thus, the second diffraction element 70 can efficiently condense the imaging light L0 toward the eye E of the observer.

Figure 4:
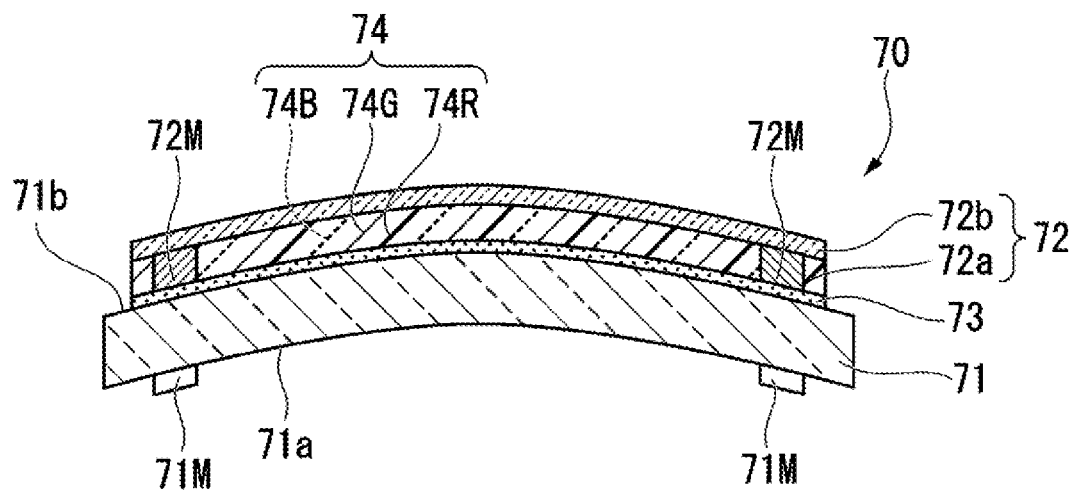
FIG. 4 is a diagram illustrating a configuration of a main part of a second diffraction element.

FIG. 4 is a diagram illustrating a configuration of a main part of the second diffraction element 70. As illustrated in FIG. 4, the second diffraction element 70 includes a plastic substrate 71, a hologram layer 72, and an adhesive 73. The plastic substrate 71 has a curved surface shape curving such that an outer surface 71b is convex with respect to an inner surface 71a. The plastic substrate 71 is formed from a transparent material having an elastic modulus of from 2 GPa to 3 GPa, for example. More specifically, a transmissive plastic substrate made of, for example, a cycloolefin resin, an acrylic resin, polycarbonate, or the like was used as the plastic substrate 71.

The hologram layer 72 includes a hologram 72a and a transparent film layer 72b. The hologram 72a is a hologram photosensitive layer formed from a photopolymer material having a thickness of approximately 5 to 50 µm. The transparent film layer 72b is a protective layer that protects the hologram 72a, and is transmissive. The transparent film layer 72b is formed from, for example, a transparent film such as PET (polyethylene terephthalate), PC (polycarbonate), PA (polyamide), and TAC (triacetyl cellulose). The hologram layer 72 is affixed to the outer surface 71b of the plastic substrate 71 via the adhesive 73. The adhesive 73 has predetermined transmissivity. Note that, the adhesive 73 can be omitted as necessary. That is, the hologram layer 72 may be directly affixed to the outer surface 71b of the plastic substrate 71.

The hologram 72a has interference fringes 74 formed therein and functions as a diffraction grating. The interference fringes 74 are recorded as differences in refractive index and the like in a hologram photosensitive layer, and the interference fringes 74 are inclined in one direction with respect to the incident surface 70a of the second diffraction element 70 so as to correspond to a specific incident angle. Therefore, as illustrated in FIG. 3, the second diffraction element 70 diffracts and deflects the imaging light L0 in a predetermined direction. The specific wavelength and the specific incident angle respectively correspond to a wavelength and an incident angle of the imaging light L0.

In the present exemplary embodiment, the imaging light L0 is imaging light for color display. The imaging light L0 of red light, green light, and blue light is incident on the second diffraction element 70, and the incident imaging light L0 is diffracted and emitted in a predetermined direction. The interference fringes 74 of the hologram 72a include interference fringes 74R formed at a pitch corresponding to red imaging light LR having a wavelength, in a wavelength range of 580 nm to 700 nm, for example, of 615 nm, an interference fringes 74G formed at a pitch corresponding to green imaging light LG having a wavelength, in a wavelength range of 500 nm to 580 nm, for example, of 535 nm, and interference fringes 74B formed at a pitch corresponding to blue imaging light LB having a wavelength, in a wavelength range of 400 nm to 500 nm, for example, of 460 nm.

The interference fringes 74 are fringes formed by separating coherent light emitted from a common light source into object light and reference light, and irradiating a hologram forming material with the separated object light and reference light to perform interference exposure. The interference fringes are recorded as change in refractive index, change in transmittance, change in shape such as uneven patterns.

In the second diffraction element 70, the hologram layer 72 includes a second alignment mark 72M. The second alignment mark 72M is exposed inside the hologram 72a of the hologram layer 72 together with the interference fringes 74. The second alignment mark 72M is used as a mark for positioning when affixing to the plastic substrate 71.

In addition, in the second diffraction element 70, the plastic substrate 71 has a first alignment mark 71M. In the present exemplary embodiment, the plastic substrate 71 and the hologram layer 72 are affixed to each other such that the first alignment mark 71M and the second alignment mark 72M have a predetermined positional relationship. For example, when observed from above by a microscope or camera, the plastic substrate 71 and the hologram layer 72 are affixed to each other, in a state where the first alignment mark 71M on the plastic substrate 71 and the second alignment mark 72M in the hologram layer 72 overlap with each other in a planar manner. Note that, as far as a position of the hologram layer 72 with respect to the plastic substrate 71 can be defined, the first alignment mark 71M and the second alignment mark 72M need not overlap with each other when observed from above.

In the present exemplary embodiment, the second diffraction element 70 is manufactured by forming the hologram layer 72 at the glass substrate, and then affixing the hologram layer 72 peeled off from the glass substrate to the plastic substrate 71. A method for manufacturing the second diffraction element 70 will be described specifically below.

The method for manufacturing the second diffraction element 70 includes a first step for forming a hologram layer at a glass substrate, and a second step for affixing the hologram layer peeled off from the glass substrate to a plastic substrate.

First, the first step for forming the hologram layer at the glass substrate will be described.

Figure 5:
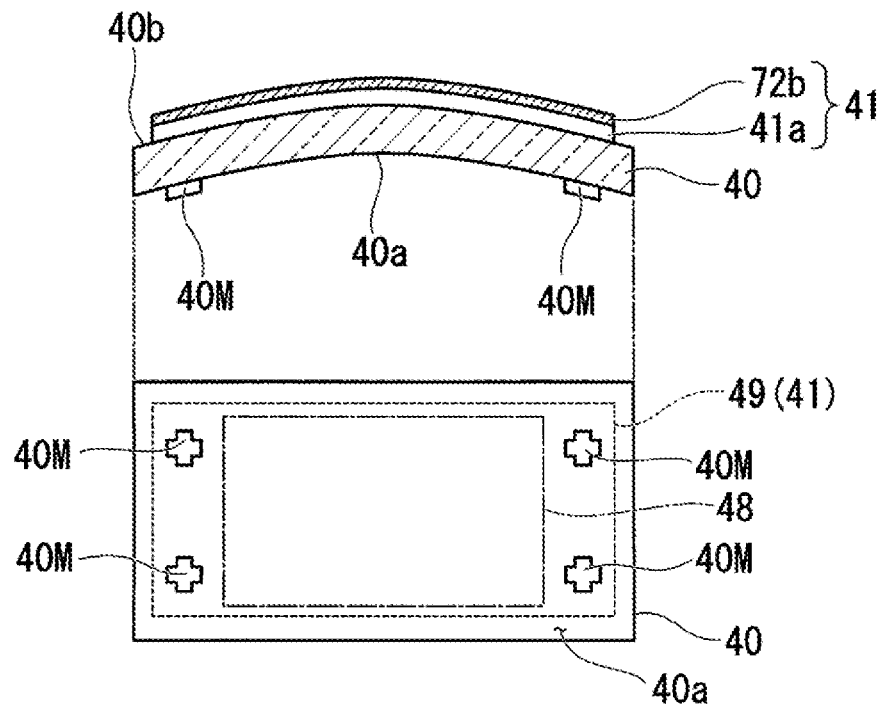
FIG. 5 is an explanatory diagram of a first step.

FIG. 5 is an explanatory diagram of the first step. In FIG. 5, an upper stage is a side cross-sectional view, and a lower stage is a plan view of the glass substrate viewed from an inside to an outside.

In the first step, as illustrated in FIG. 5, a hologram forming material 41 is affixed to a glass substrate 40. The glass substrate 40 has an inner surface (first surface) 40a and an outer surface (second surface) 40b that is opposite to the inner surface 40a, and has a curved surface shape curving such that the outer surface 40b is convex. The glass substrate 40 has an elastic modulus of 50 GPa or larger, for example.

The hologram forming material 41 includes a hologram material 41a and the transparent film layer 72b. The hologram material 41a is a volume holographic material layer formed from a photopolymer material having a thickness of approximately 5 to 50 µm, in which a photosensitive material having sensitivity to respective wavelengths of red, green, and blue is dispersed.

Note that, in the hologram forming material 41, in a state before being affixed to the glass substrate 40, an adhesive surface of the hologram material 41a is, for example, covered with a cover film, such as PET. Note that, since the hologram material 41a is peeled off from the glass substrate 40 after interference exposure, the hologram material 41a is set to have adhesive force such that the hologram material 41a can be held on the glass substrate 40 during exposure, and can be easily peeled.

The cover film of the hologram forming material 41 is peeled off in a dark room, and a side of the hologram material 41a is brought into a state of being exposed. Since the photopolymer of the hologram material 41a is in an uncured or semi-cured state and has adhesiveness, the hologram material 41a can be favorably glued to the outer surface 40b of the glass substrate 40 by being pressed with a roller or the like.

In the present exemplary embodiment, the glass substrate 40 includes a marking portion 40M. The marking portion 40M is formed to be convex at the inner surface (first surface) 40a of the glass substrate 40. For example, by engraving an alignment mark in a glass molding die in advance, the marking portion 40M is precisely provided on the inner surface 40a of the glass substrate 40. For the marking portion 40M, for example, a mark can be adopted that has a shape that is easily aligned, such as a cross shape, a circular shape, or a double circular shape. Note that, for example, for the marking portion 40M, it is desirable that a cross-sectional shape is a V-shape or a semicircular shape, and a depth is approximately 10 to 100 μm.

In the present exemplary embodiment, the convex marking portion 40M is formed at the inner surface 40a of the glass substrate 40 that is opposite to an affixing surface (outer surface 40b) of the hologram forming material 41. As such, the marking portion 40M does not prevent affixing of the hologram forming material 41 to the glass substrate 40.

As illustrated in the lower stage of FIG. 5, in the inner surface 40a of the glass substrate 40, the marking portion 40M is provided on a region positioned on an outer side of an optically effective region 48 and on an inner side of an affixing region 49 of the hologram forming material 41. Here, the optically effective region 48 refers to a region that functions effectively as a diffraction element for obtaining desirable diffraction performance in the hologram layer 72 formed by the subsequent interference exposure.

The affixing of the hologram forming material 41 to the glass substrate 40 is completed as described above.

Subsequently, the hologram forming material 41 is subjected to the interference exposure.

Figure 6:
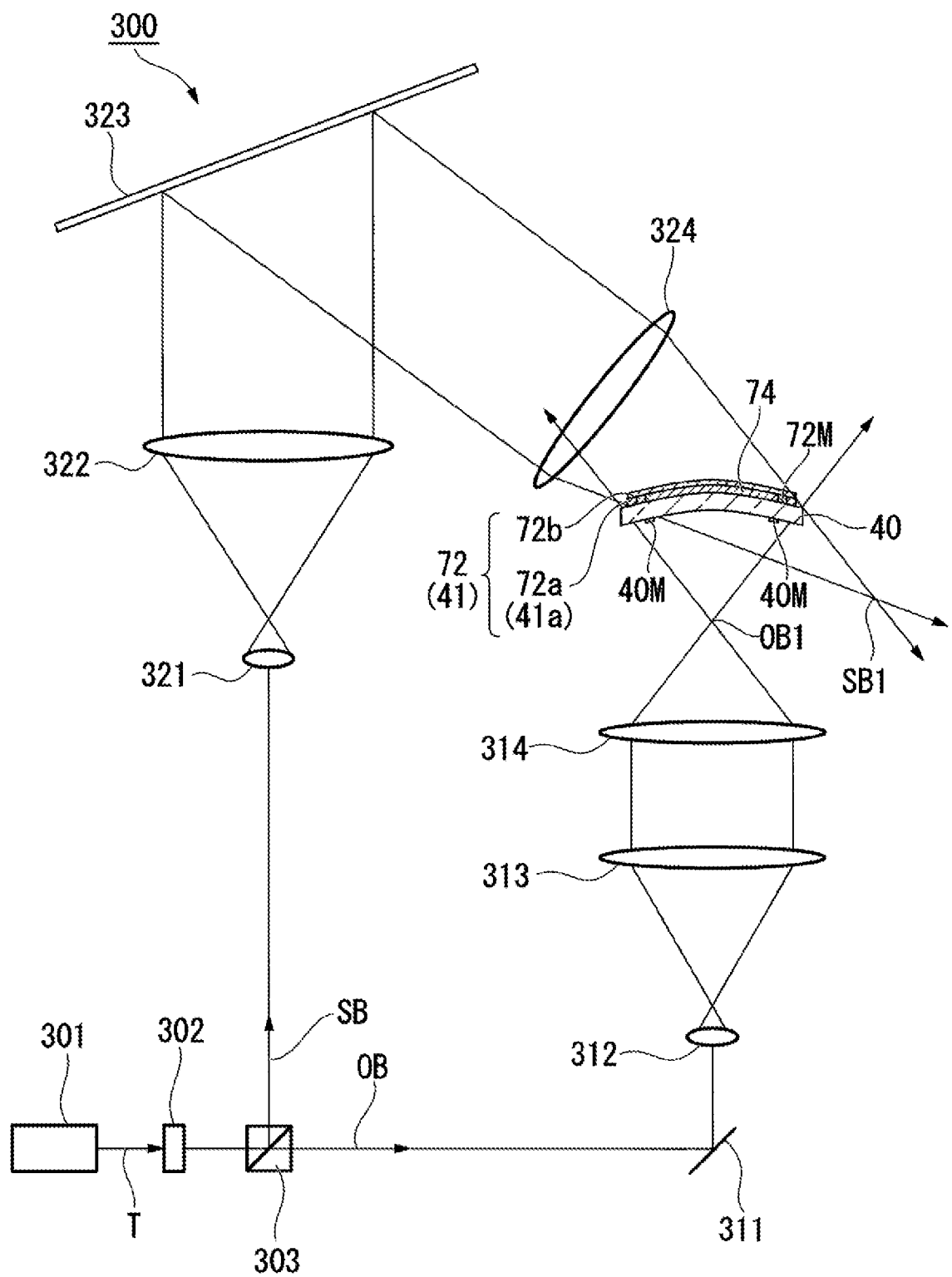
FIG. 6 is an explanatory diagram of an interference exposure step.

FIG. 6 is an explanatory diagram of an interference exposure step.

In the interference exposure, reference light SB that converges to a reference point SB1 and object light OB that diverges from an object point OB1 interfere with each other at the hologram forming material 41 (hologram material 41a), and the hologram forming material 41 is exposed to obtain the hologram layer 72.

An exposure device 300 illustrated in FIG. 6 is used in the interference exposure step. The exposure device 300 includes a laser light source 301 that emits laser light T serving as exposure light, a shutter 302 that switches between passing and blocking of the laser light T, and a beam splitter 303 that separates the laser beam T into the object light OB and the reference light SB. It is also possible to use a polarizing beam splitter instead of the beam splitter 303. When a polarizing beam splitter is used, an intensity ratio of the object light OB and the reference light SB can be adjusted, in combination with a half-wave plate.

The exposure device 300 switches wavelengths of the laser light T emitted from the laser light source 301 in accordance with a corresponding wavelength of interference fringes formed in the hologram forming material 41.

In addition, the exposure device 300 includes a first exposure optical system 310 that irradiates with the object light OB from one surface side of the hologram forming material 41 affixed to the glass substrate 40, and a second exposure optical system 320 that irradiates with the reference light SB from another surface side of the hologram forming material 41 affixed to the glass substrate 40.

The first exposure optical system 310 includes a first mirror 311 that bends an optical path of the object light OB, and a first lens 312 that adjusts a luminous flux diameter of the object light OB, a first collimator lens 313 that turns the object light OB having the luminous flux diameter expanded by the first lens 312 into parallel luminous flux, and a first condensing lens 314 that makes the object light OB incident so as to be condensed in front of the hologram forming material 41. The first exposure optical system 310 irradiates one surface of the hologram forming material 41 with the object light OB as divergent light (spherical waves).

The second exposure optical system 320 includes a second lens 321 that adjusts a luminous flux diameter of the reference light SB, a second collimator lens 322 that turns the reference light SB having the luminous flux diameter expanded by the second lens 321 into parallel luminous flux, a second mirror 323 that bends an optical path of the parallelized reference light SB, and a second condensing lens 324 that makes the reference light SB incident so as to be condensed on a back side of the hologram forming material 41. The second exposure optical system 320 irradiates another surface of the hologram forming material 41 with the reference light OB as convergent light (spherical waves).

The exposure device 300 can use the object light OB and the reference light Sb with respective wavelengths and perform the interference exposure for the hologram forming material 41, as illustrated in FIG. 4, to form the interference fringes 74 in which the interference fringes 74R, 74G, and 74B are superimposed on each other in one layer in the hologram material 41a of the hologram forming material 41. The interference fringes 74 generate refractive index distribution for light with respective wavelengths within the hologram material 41a, thereby forming the hologram 72a.

In addition, in the interference exposure step, each of the object light OB and the reference light SB transmits the marking portion 40M formed at the glass substrate 40.

The marking portion 40M has a function of utilizing a difference between a refractive index and that in the air to refract part of each of the object light OB and the reference light SB. Thus, an optical path that transmits the marking portion 40M is different from an optical path that does not transmit the marking portion 40M. Thus, a phase of interference fringes due to each of the object light OB and the reference light SB transmitting the marking portion 40M differs from a phase of interference fringes due to each of the object light OB and the reference light SB not transmitting the marking portion 40M. That is, the interference fringes due to light transmitting the marking portion 40M are not continuous with the interference fringes 74 due to other light not transmitting through the marking portion 40M. Thus, the interference fringes of the light transmitting the marking portion 40M are formed inside together with the interference fringes 74, but are fringes not continuous with the interference fringes 74, thus the interference fringes of the light transmitting the marking portion 40M can be distinguished from the interference fringes 74. The interference fringes of the light transmitting the marking portion 40M in this manner are recorded in the hologram 72a together with the interference fringes 74, thereby forming the second alignment mark 72M available for positioning the hologram layer 72.

As described above, the second alignment mark 72M is formed in the hologram layer 72 together with the interference fringes 74. In the present exemplary embodiment, the marking portion 40M is, as illustrated in FIG. 5, provided outside the optically effective region 48 and inside the affixing region 49 of the hologram forming material 41, thus the second alignment mark 72M is formed in a region of the hologram layer 72 that does not adversely affect a diffraction function.

The second alignment mark 72M is formed at a place shifted from a position of the marking portion 40M on the glass substrate 40. This amount of shift is determined depending on a degree of curvature of the glass substrate 40, a thickness of the glass substrate 40, and respective incident angles of the object light OB and the reference light SB with respect to the marking portion 40M. Therefore, the amount of shift of the second alignment mark 72M is desirably determined in advance by simulation or the like. Specifically, the marking portion 40M is provided on the optical path of each of the object light OB and the reference light SB, and at a place corresponding to a position at which the second alignment mark 72M of the hologram 72a is to be formed.

Note that, the hologram layer 72 at which the interference fringes 74 are formed is subjected to UV radiation, visible light radiation, and heat treatment to fix the recorded fringes, and to decolorise the hologram layer 72.

Incidentally, in a reaction process of forming the interference fringes 74 by the interference exposure, the hologram material 41a included in the hologram forming material 41 contracts and expands. Which of the contraction and the expansion occurs is determined depending on difference in respective reaction systems. When the contraction or the expansion occurs, warping may occur in a supporting body that supports the hologram forming material 41 (hologram material 41a). When warping occurs in the supporting body during a production process of the interference fringes 74, diffraction performance of the interference fringes 74 produced deteriorates due to the effects of warping.

Compared to this, in the method for manufacturing of the present exemplary embodiment, the interference exposure is performed in a state in which the hologram forming material 41 is supported by the glass substrate 40 having a higher elastic modulus compared to the plastic substrate 71. Accordingly, the occurrence of warping is reduced compared to when the plastic substrate 71 is used as a supporting body, and the interference fringes 74 are manufactured for which the effects of warping are reduced.

As described above, according to the first step, after the hologram forming material 41 is affixed to the glass substrate 40 having the marking portion 40M, the interference exposure is performed for the hologram forming material 41 to form the hologram layer 72 at the glass substrate 40.

Figure 7:
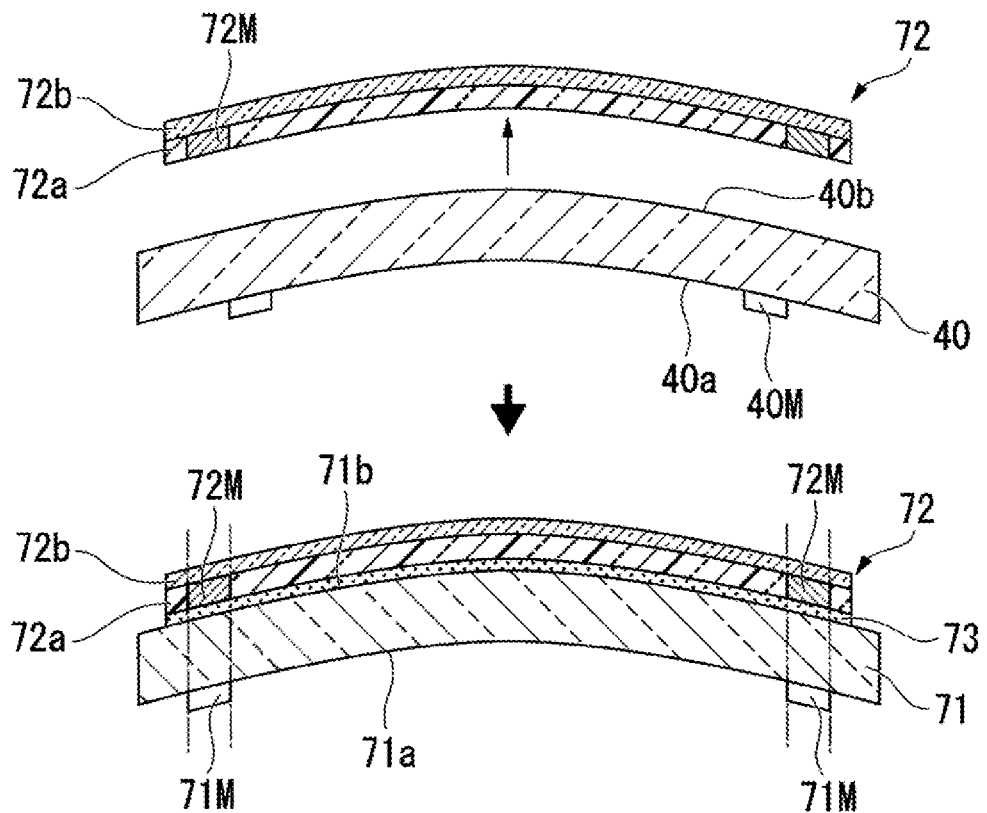
FIG. 7 is an explanatory diagram of a second step.

Next, the second step for affixing the hologram layer peeled off from the glass substrate to the plastic substrate will be described. FIG. 7 is an explanatory diagram of the second step.

As illustrated in FIG. 7, the hologram layer 72 formed by the interference exposure described above is peeled off from the glass substrate 40, and affixed to the plastic substrate 71 while being positioned. The plastic substrate 71 has a shape similar to that of the glass substrate 40. That is, the plastic substrate 71 has the inner surface (first surface) 71a and the outer surface (second surface) 71b that is opposite to the inner surface 71a, and has a curved surface shape curving such that the outer surface 71b is convex. The first alignment mark 71M that is used for positioning with the hologram layer 72 is formed in advance at the plastic substrate 71.

In the second step, the first alignment mark 71M formed in advance at the plastic substrate 71 and the second alignment mark 72M formed in the hologram layer 72 during the interference exposure are used to position the plastic substrate 71 and the hologram layer 72.

A position of the first alignment mark 71M on the plastic substrate 71 is set at a place corresponding to a position of the second alignment mark 72M in the hologram layer 72 calculated by the calculation described above. In the second step of the present exemplary embodiment, the plastic substrate 71 is used in which the first alignment mark 71M is disposed at a position in consideration of shifting of an exposure position at the first alignment mark 71M with respect to the marking portion 40M.

In the present exemplary embodiment, for example, when observed from above by a microscope or camera, the plastic substrate 71 and the hologram layer 72 are positioned such that the first alignment mark 71M on the plastic substrate 71 and the second alignment mark 72M in the hologram layer 72 overlap with each other in a planar manner.

According to this configuration, the first alignment mark 71M and the second alignment mark 72M can be overlapped with each other in a planar manner to easily position the plastic substrate 71 and the hologram layer 72. Note that, when the second alignment mark 72M formed in the hologram layer 72 is difficult to view, for example, by devising a way of irradiating the hologram layer 72 with light, a difference in degree of diffraction of light generated between the site where the second alignment mark 72M is formed and the other site can be utilized to increase visibility of the second alignment mark 72M.

Since the hologram layer 72 is subjected to the above-described processes such as interference exposure, ultraviolet light irradiation, visible light irradiation, and heat treatment, there is a possibility that adhesive force is lost and adhesion with the plastic substrate 71 cannot be sufficiently obtained. In the present exemplary embodiment, the hologram layer 72 and the plastic substrate 71 can be reliably bonded to each other by disposing the adhesive 73 being transmissive between the hologram layer 72 and the plastic substrate 71.

According to the steps described above, the second diffraction element 70 is manufactured in which the hologram layer 72 is affixed to the plastic substrate 71 via the adhesive 73.

According to the method for manufacturing the second diffraction element 70 of the present exemplary embodiment, when forming the hologram layer 72, the glass substrate 40 that does not easily warp can be used as a supporting body for the hologram forming material 41, to form the interference fringes 74 precisely in the hologram layer 72. Here, when the glass substrate 40 is used as-is as a support substrate for the hologram layer 72, the glass substrate 40 may be broken due to shock, vibration, or the like, and thus reliability of the second diffraction element 70 may be reduced. In addition, since it is desirable for the optical system 10 of the display device 100 to be lighter, it is undesirable to utilize the glass substrate 40 that increases weight of the second diffraction element 70 for configuring the second diffraction element 70.

In the method for manufacturing of the present exemplary embodiment, the recording of the interference fringes 74 and the recording of the second alignment mark 72M in the hologram layer 72 are performed simultaneously, thus shift in position of the interference fringes 74 and the second alignment mark 72M does not occur. Then, by positioning the first alignment mark 71M on the plastic substrate 71 and the second alignment mark 72M in the hologram layer 72, the second diffraction element 70 is manufactured in which a hologram layer 72 having interference fringes 74 for which effects of warping are suppressed is affixed to a predetermined position on the plastic substrate 71. Thus, according to the second diffraction element 70 of the present exemplary embodiment, the plastic substrate 71 and the hologram layer 72 are affixed to each other precisely. Thus, the second diffraction element 70 of the present exemplary embodiment, as illustrated in FIG. 3, can efficiently condense the imaging light L0 toward the eye E of the observer.

According to the second diffraction element 70 of the present exemplary embodiment, it is possible to provide a diffraction element, that includes the interference fringes 74 for which reduction in performance caused by warping of a supporting body during interference exposure is suppressed, and includes the plastic substrate 71 as the supporting body, and thus is light and excellent in impact resistance, that is, tough against breakage, cracking, and the like.

The first diffraction element 50 with the same basic configuration as the second diffraction element 70 is also configured with a reflection-type volume holographic element. Since the first diffraction element 50 is manufactured by a method for manufacturing similar to that of the second diffraction element 70, a similar effect to that of the second diffraction element 70 can be obtained. That is, according to the first diffraction element 50, it is possible to provide a diffraction element, that includes interference fringes for which reduction in performance caused by warping of a supporting body during interference exposure is suppressed, and includes a plastic substrate as a supporting body, and thus is light and excellent in impact resistance.

Additionally, an incident surface 50a of the first diffraction element 50 on which the imaging light L0 is incident has a concave curved surface shape being recessed. In other words, the incident surface 50a has a shape having a central portion recessed and curved with respect to a peripheral portion in an incident direction of the imaging light L0. Thus, the first diffraction element 50 can efficiently deflect the imaging light L0 toward the light-guiding system 60.

Figure 8:
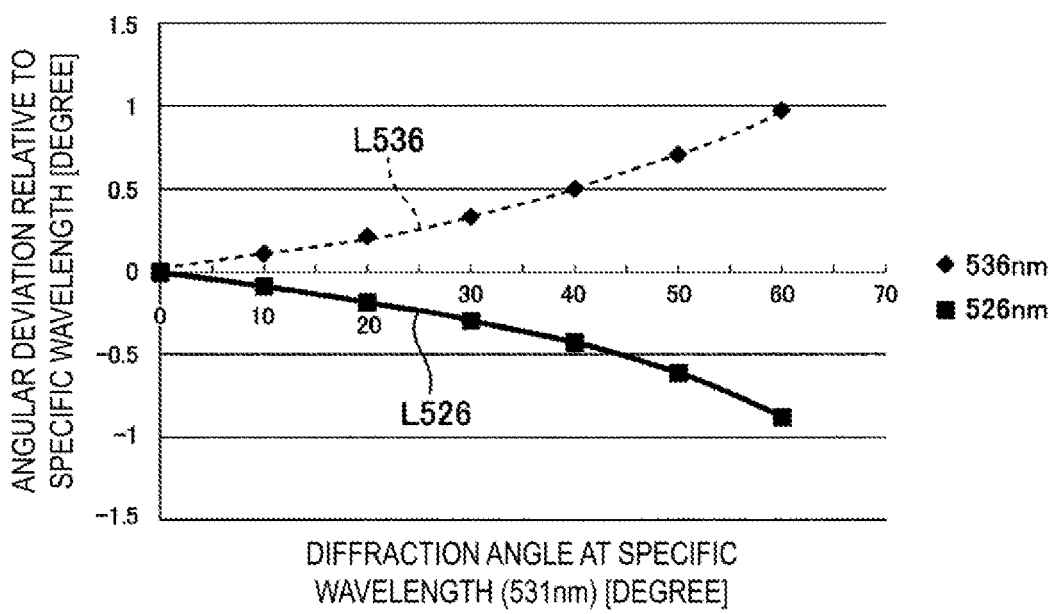
FIG. 8 is an explanatory diagram showing diffraction characteristics of a first diffraction element and a second diffraction element.

FIG. 8 is an explanatory diagram showing respective diffraction characteristics of the first diffraction element 50 and the second diffraction element 70 illustrated in FIG. 3. FIG. 8 shows a difference in diffraction angle between a specific wavelength and a peripheral wavelength when a light ray is incident on one point on a volume hologram. In FIG. 8, when the specific wavelength is 531 nm, a deviation in a diffraction angle of light with a peripheral wavelength of 526 nm is indicated by a solid line L526, and a deviation in the diffraction angle of light with a peripheral wavelength of 536 nm is indicated by a dotted line L536. As shown in FIG. 8, even when light rays are incident on the same interference fringes recorded in the hologram, a light ray with a longer wavelength is more significantly diffracted, and a light ray with a shorter wavelength is less likely to diffracted. Thus, when two diffraction elements, namely, the first diffraction element 50 and the second diffraction element 70 are used as in the present exemplary embodiment, proper wavelength compensation fails to be achieved unless considerations are given for a light ray angle of incident light with a wavelength larger or smaller than the specific wavelength. In other words, color aberration occurring in the second diffraction element 70 fails to be canceled. Because an angle of diffraction varies depending on the number of interference fringes, interference fringes need to be considered.

In the optical system 10 illustrated in FIG. 3, wavelength compensation, i.e., color aberration, can be canceled because, as described in JP-A-2017-167181, a direction of incidence on the second diffraction element 70 and the like have been made appropriate based on the number of times that an intermediate image is formed between the first diffraction element 50 and the second diffraction element 70 and whether the sum of the numbers of reflections by the mirror 62 is odd or even.

Specifically, as illustrated in FIG. 3, the imaging light L0 incident on the first diffraction element 50 is diffracted and deflected by the first diffraction element 50. At this time, the light L2 on the long wavelength side with respect to the specific wavelength has a diffraction angle $\theta_2$ larger than a diffraction angle $\theta_1$ of the light L1 with the specific wavelength. The light L3 on the short wavelength side with respect to the specific wavelength has a diffraction angle $\theta_3$ smaller than a diffraction angle $\theta_1$ of the light L1 with the specific wavelength. Therefore, the imaging light L0 emitted from the first diffraction element 50 is deflected and dispersed at each wavelength.

The imaging light L0 emitted from the first diffraction element 50 is incident on the second diffraction element 70 via the light-guiding system 60 and is then diffracted and deflected by the second diffraction element 70. At this time, on an optical path from the first diffraction element 50 to the second diffraction element 70, an intermediate image is formed once, and reflection by the mirror 62 is performed once. Therefore, when the incident angle is defined as an angle between the imaging light L0 and a normal line of an incident surface of the second diffraction element 70, the light L2 on the long wavelength side with respect to the specific wavelength has an incident angle $\theta_{12}$ larger than an incident angle $\theta_{11}$ of the light L1 with the specific wavelength, and the light L3 on the short wavelength side with respect to the specific wavelength has an incident angle $\theta_{13}$ smaller than the incident angle $\theta_{11}$ of the light L1 with the specific wavelength. As described above, the light L2 on the long wavelength side with respect to the specific wavelength has the diffraction angle $\theta_2$ larger than the diffraction angle $\theta_1$ of the light L1 with the specific wavelength. The light L3 on the short wavelength side with respect to the specific wavelength has the diffraction angle $\theta_3$ smaller than the diffraction angle $\theta_1$ of the light L1 with the specific wavelength.

Accordingly, the light L2 on the long wavelength side with respect to the specific wavelength is incident on the first diffraction element 50 at a larger incident angle than the light L1 with the specific wavelength. However, the light L2 on the long wavelength side with respect to the specific wavelength has a larger diffraction angle than the diffraction angle of the light L1 with the specific wavelength, and as a result, the light L2 on the long wavelength side with respect to the specific wavelength and the light L1 with the specific wavelength are substantially parallel when being emitted from the second diffraction element 70. In contrast, the light L3 on the short wavelength side with respect to the specific wavelength is incident on the first diffraction element 50 at a smaller incident angle than the light L1 with the specific wavelength. However, the light L3 on the short wavelength side with respect to the specific wavelength has a smaller diffraction angle than the diffraction angle of the light L1 with the specific wavelength, and as a result, the light L3 on the short wavelength side with respect to the specific wavelength and the light L1 with the specific wavelength are substantially parallel when being emitted from the second diffraction element 70. Accordingly, as illustrated in FIG. 3, the imaging light L0 emitted from the second diffraction element 70 is incident on the eye E of the observer as substantially parallel light, thus suppressing a shift in an imaging position on a retina E0 at each wavelength. Accordingly, the color aberration occurring in the second diffraction element 70 can be canceled.

The first diffraction element 50 and the second diffraction element 70 of the present exemplary embodiment are manufactured by the method for manufacturing described above to reduce the effects of warping occurring during the interference exposure, and thus have the interference fringes that obtain desired diffraction performance. Thus, according to the first diffraction element 50 and the second diffraction element 70 of the present exemplary embodiment, color aberration can be precisely canceled as described above.

Now, a conjugate relationship between the first diffraction element 50 and the second diffraction element 70 will be described.

Figure 9A:
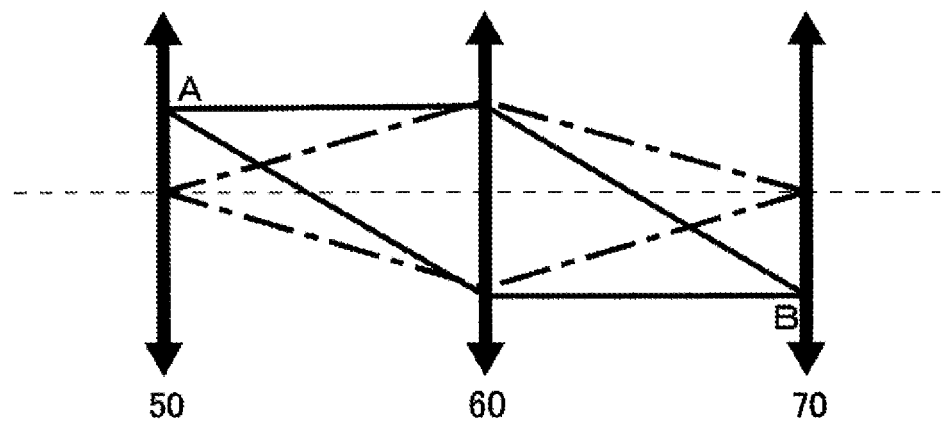
FIG. 9A is an explanatory diagram of a case in which the first diffraction element and the second diffraction element have a conjugate relationship.
Figure 9B:
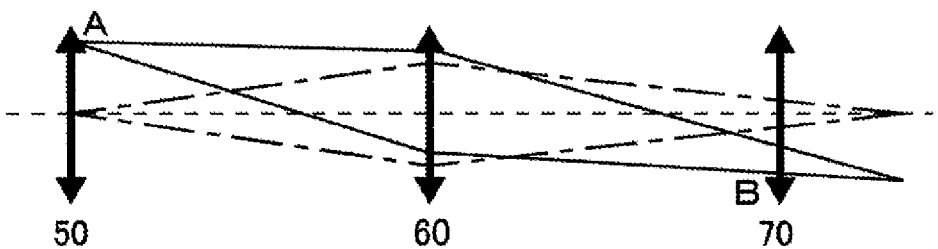
FIG. 9B is an explanatory diagram of a case in which the first diffraction element and the second diffraction element do not have a conjugate relationship.
Figure 9C:
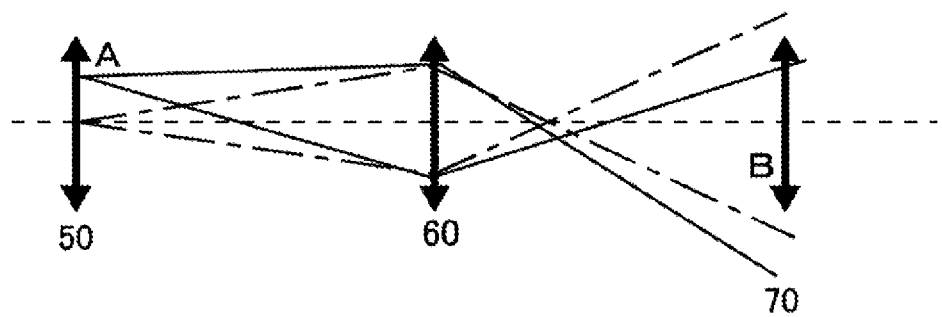
FIG. 9C is an explanatory diagram of a case in which the first diffraction element and the second diffraction element do not have a conjugate relationship.
Figure 10A:
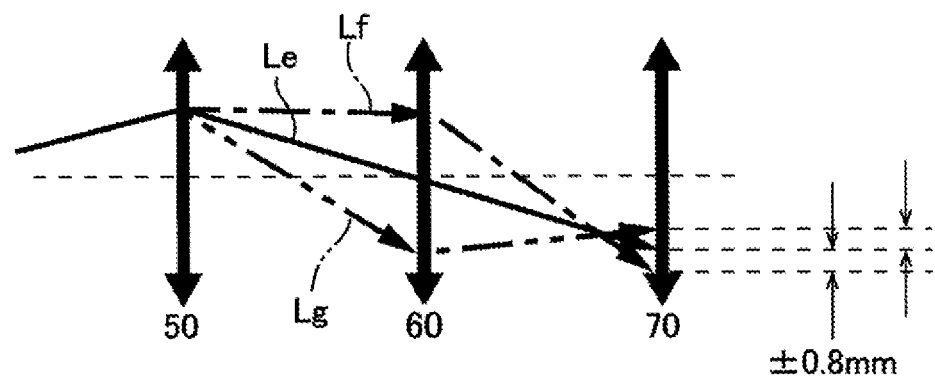
FIG. 10A is an explanatory diagram illustrating a tolerance for deviations from the conjugate relationship between the first and second diffraction elements.
Figure 10B:
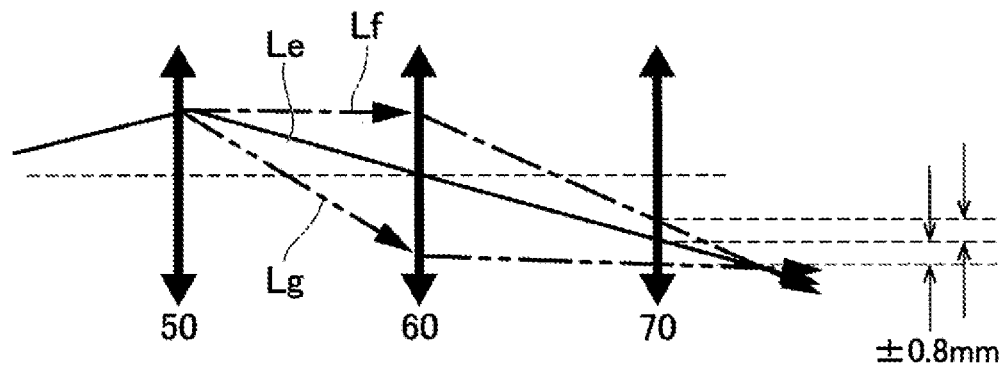
FIG. 10B is an explanatory diagram of another mode illustrating a tolerance for deviation from the conjugate relationship.

FIG. 9A is an explanatory diagram of a case where the first diffraction element 50 and the second diffraction element 70 are in the conjugate relationship. FIG. 9B and FIG. 9C are explanatory diagrams of cases where the first diffraction element 50 and the second diffraction element 70 are not in the conjugate relationship. FIG. 10A and FIG. 10B are explanatory diagrams illustrating a tolerance for deviations from the conjugate relationship between the first diffraction element 50 and the second diffraction element 70 illustrated in FIG. 9B and FIG. 9C, respectively. In FIG. 10A and FIG. 10B, light with a specific wavelength is indicated by a solid line Le, light with a specific wavelength −10 nm is indicated by a dot-dash line Lf, and light with a specific wavelength +10 nm is indicated by a two-dot chain line Lg. Note that, in FIG. 9A to FIG. 9C, FIG. 10A, and FIG. 10B, for facilitation of understanding of light traveling, the first diffraction element 50, the second diffraction element 70, and the light-guiding system 60 are illustrated as a transmissive-type and indicated by arrows.

As illustrated in FIG. 9A, when the first diffraction element 50 and the second diffraction element 70 are in the conjugate relationship, divergent light rays emitted from a point A (first position) of the first diffraction element 50 are collected by the light-guiding system 60 having positive power, and are incident at a point B (second position corresponding to the first position) of the second diffraction element 70. Therefore, color aberration caused by diffraction occurring at the point B can be compensated for at the point A.

In contrast, as illustrated in FIG. 9B and FIG. 9C, when the first diffraction element 50 and the second diffraction element 70 are not in the conjugate relationship, divergent light rays emitted from the point A of the first diffraction element 50 are collected by the light-guiding system 60, centrally located and having positive power, but intersect with each other and are incident at a position farther from the point B on the second diffraction element 70 or at a point between the first diffraction element 50 and the point B. Thus, the point A and the point B are not in a one-to-one relationship. Here, since a compensation effect increases when interference fringes are uniform within a region, the compensation effect decreases when the first diffraction element 50 and the second diffraction element 70 are not in the conjugated relationship. On the other hand, it is difficult to compensate for the entire projection region of the second diffraction element 70 by the first diffraction element 50. Therefore, in the aspects illustrated in FIG. 9B and FIG. 9C, sufficient wavelength compensation fails to be achieved, leading to a reduced resolution.

Note that there is an error of about ±0.4 mm from the point B that the light having the specific wavelength reaches in the light having the wavelength of ±10 nm with respect to the specific wavelength, but a decrease in resolution is not noticeable. Results of examination of such a permissible range indicate that, as illustrated in FIG. 10A, a decrease in resolution is unnoticeable when light rays with the specific wavelength intersect with each other at a point between the first diffraction element 50 and the point B on the second diffraction element 70, corresponding to the ideal point at which the light with the specific wavelength arrives, and are incident in a range of ±0.8 mm from the point B. As illustrated in FIG. 10B, a decrease in resolution is unnoticeable when light of a specific wavelength is incident in a range of ±0.8 mm that intersects with the B point on the ideal second diffraction element 70 where light of a specific wavelength reaches. Therefore, even when the first diffraction element 50 and the second diffraction element 70 are not in the perfect conjugate relationship, a decrease in resolution is permissible when the first diffraction element 50 and the second diffraction element 70 are in a substantially conjugate relationship and the light rays arrive within the range of ±0.8 mm from the ideal point B. In other words, in the present exemplary embodiment, the conjugate relationship between the first diffraction element 50 and the second diffraction element 70 means that the incident position of light with the specific wavelength has an error range of ±0.8 mm from the ideal incident point.

Figure 11:
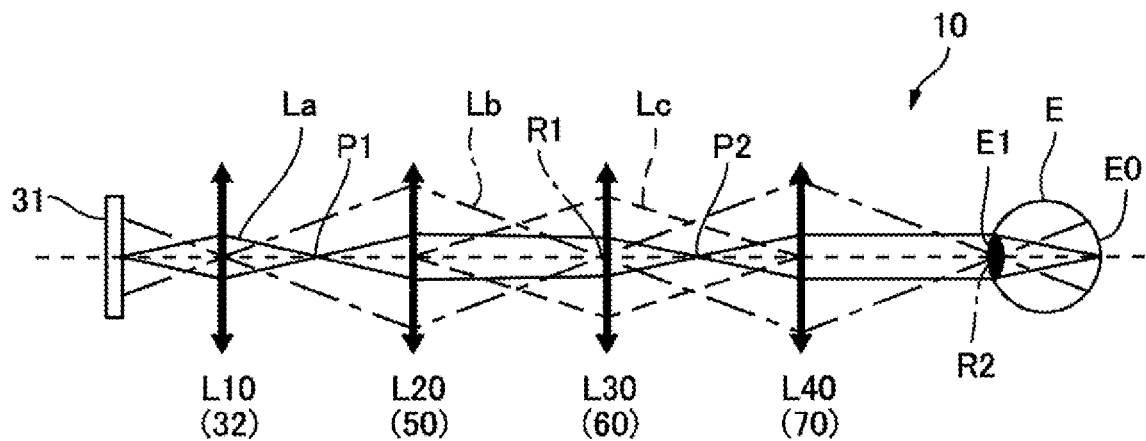
FIG. 11 is a light ray diagram of the optical system.

FIG. 11 is a diagram of light rays in the optical system 10 of the present exemplary embodiment. In FIG. 11, each optical unit disposed along an optical axis is indicated by a thick arrow. A solid line La indicates a light ray emitted from one pixel of the imaging light generating device 31, a dot-dash line Lb indicates a principal light ray emitted from an end portion of the imaging light generating device 31, and a long dashed line Lc indicates a position that has a conjugate relationship with the first diffraction element 50. Here, "intermediate image" refers to a position where light rays (solid lines La) emitted from one pixel converge, and "pupil" refers to a position where the principal rays (dot-dash lines Lb) of angles of view converge. Further, FIG. 11 illustrates travel of light emitted from the imaging light generating device 31. Note that FIG. 11 illustrates all optical units in a perspective view in order to simplify the diagram.

As illustrated in FIG. 11, the optical system 10 of the present exemplary embodiment includes the first optical unit L10 having positive power, the second optical unit L20 including the first diffraction element 50 and having positive power, the third optical unit L30 having positive power, and the fourth optical unit L40 including the second diffraction element 70 and having positive power, and the first to fourth optical units L10 to L40 are provided along an optical path of imaging light emitted from the imaging light generating device 31.

A focal length of the first optical unit L10 is L/2. Focal lengths of the second optical unit L20, the third optical unit L30, and the fourth optical unit L40 are all L. Therefore, an optical distance from the second optical unit L20 to the third optical unit L30 is equal to an optical distance from the third optical unit L30 to the fourth optical unit L40.

In such an optical system 10, a first intermediate image P1 of imaging light is formed between the first optical unit L10 and the third optical unit L30, a pupil R1 is formed between the second optical unit L20 and the fourth optical unit L40, a second intermediate image P2 of imaging light is formed between the third optical unit L30 and the fourth optical unit L40, and the fourth optical unit L40 collimates the imaging light to form an exit pupil R2. At this time, the third optical unit L30 freely controllably converts the imaging light emitted from the second optical unit L20 into divergent light, convergent light, or parallel light, which is then caused to enter the fourth optical unit L40. The second optical unit L20 causes the imaging light emitted from the first optical unit L10 to be incident as convergent light on the third optical unit L30. In the optical system 10 in the present exemplary embodiment, the pupil R1 is formed in a vicinity of the third optical unit L30 between the second optical unit L20 and the fourth optical unit L40. The vicinity of the third optical unit L30 refers to a position between the second optical unit L20 and the third optical unit L30 that is closer to the third optical unit L30 than to the second optical unit L20, or a position between the third optical unit L30 and the fourth optical unit L40, which is closer to the third optical unit L30 than to the fourth optical unit L40.

For imaging light from one point of the imaging light generating device 31, the third optical unit L30 causes light with a peripheral wavelength deviated from the specific wavelength due to deflection by the first diffraction element 50 to enter a predetermined range of the second diffraction element 70. In other words, the first diffraction element 50 and the second diffraction element 70 are in a conjugated relationship or a substantially conjugated relationship. Here, an absolute value of magnification of projection on the second diffraction element 70 by the third optical unit L30 of the first diffraction element 50 ranges from 0.5 times to 10 times, and the absolute value of such magnification may range from 1 time to 5 times.

Thus, according to the optical system 10 of the present exemplary embodiment, the first intermediate image P1 of the imaging light is formed between the projection optical system 32 and the light-guiding system 60, the pupil R1 is formed in a vicinity of the light-guiding system 60, the second intermediate image P2 of the imaging light is formed between the light-guiding system 60 and the second diffraction element 70, and the second diffraction element 70 collimates the imaging light to form the exit pupil R2.

In the optical system 10 in the present exemplary embodiment, the first intermediate image P1 is formed between the first optical unit L10 (projection optical system 32) and the second optical unit L20 (first diffraction element 50).

According to the optical system 10 in the present exemplary embodiment, four conditions (Conditions 1, 2, 3, and 4) described below are satisfied.

Condition 1: The light rays emitted from one point of the imaging light generating device 31 are formed into one point on the retina E0.

Condition 2: An incident pupil of the optical system and a pupil of an eye are conjugated.

Condition 3: The first diffraction element 50 and the second diffraction element 70 are appropriately disposed so as to compensate for peripheral wavelengths.

Condition 4: The first diffraction element 50 and the second diffraction element 70 are in a conjugated relationship or a substantially conjugated relationship.

More specifically, as can be understood from the solid line La illustrated in FIG. 11, Condition 1, where light rays emitted from one point of the imaging light generating device 31 form an image as one point on the retina E0, is satisfied. Consequently, the observer can visibly recognize one pixel. Further, as clearly seen from the solid line La illustrated in FIG. 11, Condition 2 that the incident pupil of the optical system 10 and the pupil E1 of the eye E are conjugated (conjugation of the pupil) is satisfied, and thus the entire region of the image generated by the imaging light generating device 31 can be visually recognized. Condition 3, where the first diffraction element 50 and the second diffraction element 70 are properly arranged so as to compensate for a peripheral wavelength, is satisfied. Consequently, color aberration occurring in the second diffraction element 70 can be canceled by performing wavelength compensation. Further, as understood from the long dashed line Lc illustrated in FIG. 11, Condition 4 that the first diffraction element 50 and the second diffraction element 70 are in a conjugate or substantially conjugate relationship is satisfied, and thus, in the first diffraction element 50 and the second diffraction element 70, it is possible to make light rays incident on a location where the interference fringes are the same and properly perform wavelength compensation. As a result, deterioration in resolution of imaging light can be prevented.

Therefore, according to the optical system 10 of the present exemplary embodiment, by properly performing the wavelength compensation, a high-quality image for which degradation in resolution is prevented can be visually recognized by the observer. Furthermore, the optical system 10 of the present exemplary embodiment includes the first diffraction element 50 and the second diffraction element 70 that each use the plastic substrate as the supporting body and are light and excellent in impact resistance. Therefore, the optical system 10 of the present exemplary embodiment is light and excellent in impact resistance, and is suitably used as the optical system of the display device 100 mounted on the head of the observer.

Second Exemplary Embodiment

Next, an optical system according to a second exemplary embodiment will be described. Although the case has been described in which the hologram layer 72 in the optical system 10 of the exemplary embodiment described above includes the interference fringes 74 in which the interference fringes 74R, 74G, 74B corresponding to the red imaging light LR, the green imaging light LG, and the blue imaging light LB, respectively, are superimposed on each other in the hologram 72a having one layer, but the configuration of the hologram layer is not limited thereto. Note that components common to the first exemplary embodiment will be given an identical reference numeral and detail description will be omitted.

In the present exemplary embodiment also, a configuration of a second diffraction element will be described as an example, but the same applies to a first diffraction element.

Figure 12:
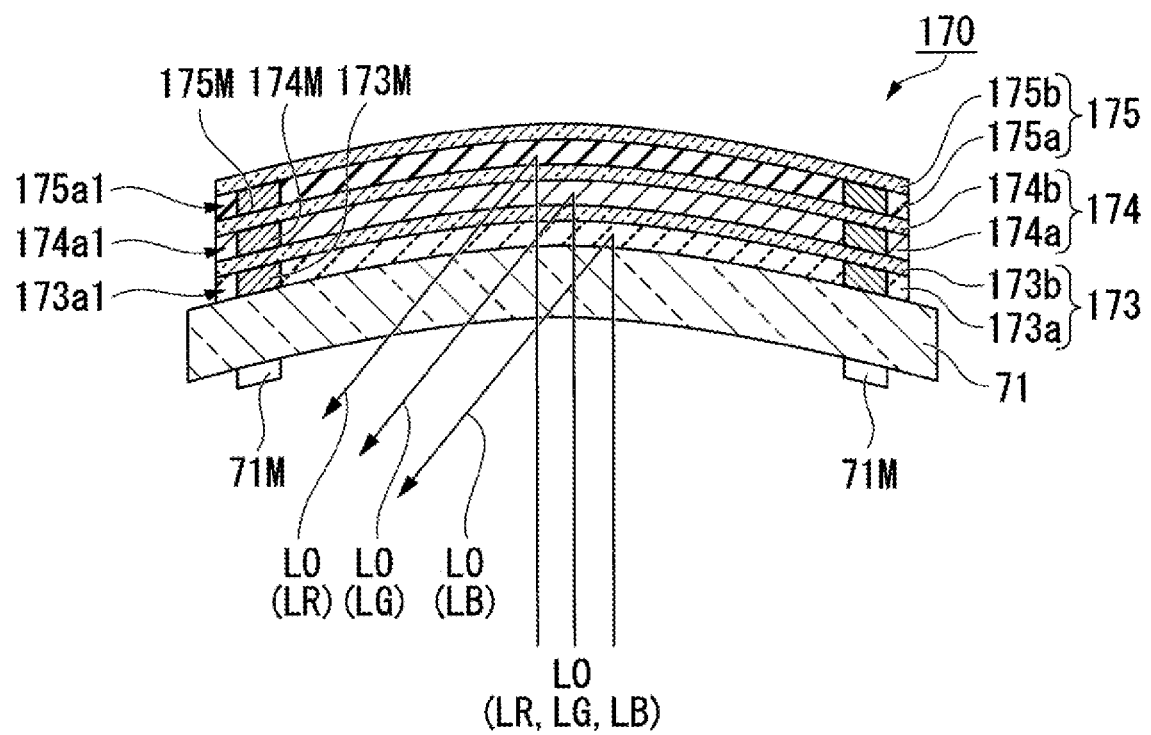
FIG. 12 is a diagram illustrating a configuration of a main part of a second diffraction element in a second exemplary embodiment.

FIG. 12 is a diagram illustrating a configuration of a main part of the second diffraction element in the present exemplary embodiment. As illustrated in FIG. 12, a second diffraction element (optical element) 170 of the present exemplary embodiment includes the plastic substrate 71, a first hologram layer 173, a second hologram layer 174, and a third hologram layer 175.

The first hologram layer 173 includes a first hologram 173a and a transparent film layer 173b. In the present exemplary embodiment, the first hologram 173a has a first interference fringes 173a1 formed therein, and functions as a diffraction grating. The first interference fringes 173a1 are interference fringes formed at a pitch corresponding to the blue imaging light LB of the imaging light L0. The first hologram layer 173 diffracts and deflects the blue imaging light LB included in the imaging light L0 in a predetermined direction.

The first hologram layer 173 has a second alignment mark 173M. The second alignment mark 173M is exposed together with the first interference fringes 173a1 in the first hologram 173a in the first hologram layer 173. The second alignment mark 173M is used as a mark for positioning when affixing to the plastic substrate 71 is performed.

The second hologram layer 174 includes a second hologram 174a and a transparent film layer 174b. In the present exemplary embodiment, the second hologram 174a has a second interference fringes 174a1 formed therein, and functions as a diffraction grating. The second interference fringes 174a1 are interference fringes formed at a pitch corresponding to the green imaging light LG of the imaging light L0. The second hologram layer 174 diffracts and deflects the green imaging light LG included in the imaging light L0 in a predetermined direction.

The second hologram layer 174 has a third alignment mark 174M. The third alignment mark 174M is exposed together with the second interference fringes 174a1 in the second hologram 174a in the second hologram layer 174. The third alignment mark 174M is used as a mark for positioning when affixing to the plastic substrate 71 is performed.

The third hologram layer 175 includes a third hologram 175a and a transparent film layer 175b. In the present exemplary embodiment, the third hologram 175a has a third interference fringes 175a1 formed therein and functions as a diffraction grating. The third interference fringes 175a1 are interference fringes formed at a pitch corresponding to the red imaging light LR of the imaging light L0. The third hologram layer 175 diffracts and deflects the red imaging light LR included in the imaging light L0 in a predetermined direction.

The third hologram layer 175 has a fourth alignment mark 175M. The fourth alignment mark 175M is exposed together with the third interference fringes 175a1 in the third hologram 175a in the third hologram layer 175. The fourth alignment mark 175M is used as a mark for positioning when affixing to the plastic substrate 71 is performed.

The second diffraction element 170 of the present exemplary embodiment has structure in which a plurality of the hologram layers 173, 174, and 175 corresponding to light of different colors are stacked on the plastic substrate 71.

The plastic substrate 71 has the first alignment mark 71M.

In the present exemplary embodiment, the plastic substrate 71 and the first hologram layer 173 are affixed to each other, such that the first alignment mark 71M and the second alignment mark 173M have a predetermined positional relationship. For example, when observed from above by a microscope or camera, the first hologram layer 173 is affixed to the plastic substrate 71 in a state where the first alignment mark 71M on the plastic substrate 71 and the second alignment mark 173M in the first hologram layer 173 overlap with each other in a planar manner.

In addition, the second hologram layer 174 is, when observed from above by a microscope or a camera, overlapped with and affixed to the first hologram layer 173, in a state where the first alignment mark 71M and the second alignment mark 173M overlap with each other in a planar manner.

Further, the third hologram layer 175 is, when observed from above by a microscope or camera, overlapped with and affixed to the second hologram layer 174, in a state where the first alignment mark 71M, the second alignment mark 173M, the third alignment mark 174M, and the fourth alignment mark 175M overlap with each other in a planar manner.

According to the second diffraction element 170 of the present exemplary embodiment, by stacking the first hologram layer 173, the second hologram layer 174, and the third hologram layer 175, corresponding to the blue imaging light LB, the green imaging light LG, and the red imaging light LR, respectively, on the plastic substrate 71, diffraction efficiency for light of the respective colors can be improved, compared to a configuration in which interference fringes corresponding to the three colors are superimposed on and formed at a single-layer hologram layer.

In the present exemplary embodiment, the second diffraction element 170 is manufactured by forming the hologram layer at the glass substrate, and then repeating a step for affixing the hologram layer peeled off from the glass substrate to the plastic substrate 71. A method for manufacturing the second diffraction element 170 will be described in detail below.

The method for manufacturing the second diffraction element 170 includes a first step for forming a first hologram layer at a glass substrate, a second step for affixing the first hologram layer peeled off from the glass substrate to a plastic substrate, a third step for forming a second hologram layer at the glass substrate, a fourth step for affixing the second hologram layer peeled off from the glass substrate to the plastic substrate, a fifth step for forming a third hologram layer at the glass substrate, and a sixth step for affixing the third hologram layer peeled off from the glass substrate to the plastic substrate.

Figure 13A:
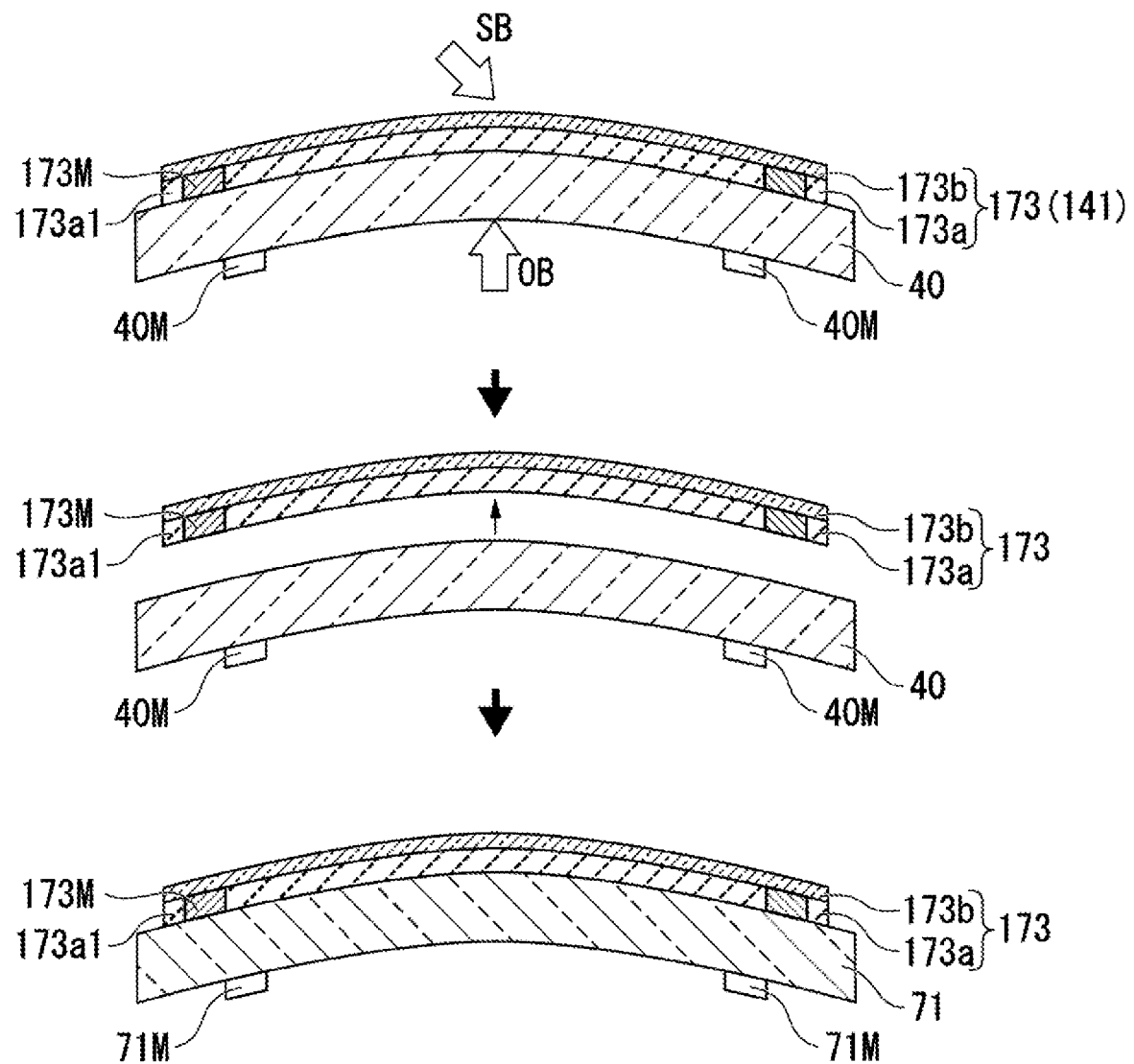
FIG. 13A is a diagram conceptually illustrating manufacturing steps of the second diffraction element in the second exemplary embodiment.
Figure 13B:
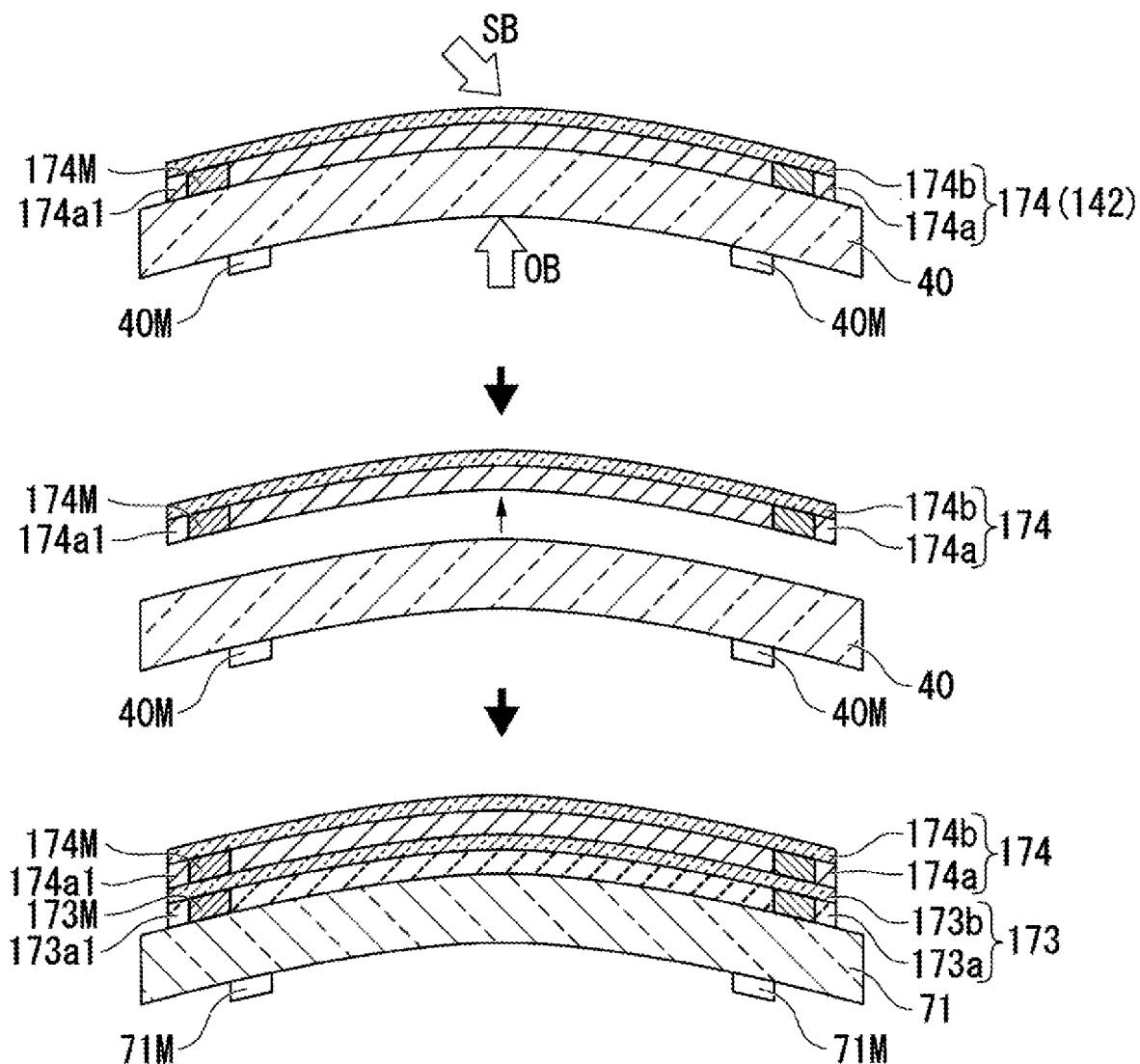
FIG. 13B is a diagram conceptually illustrating manufacturing steps of the second diffraction element in the second exemplary embodiment.
Figure 13C:
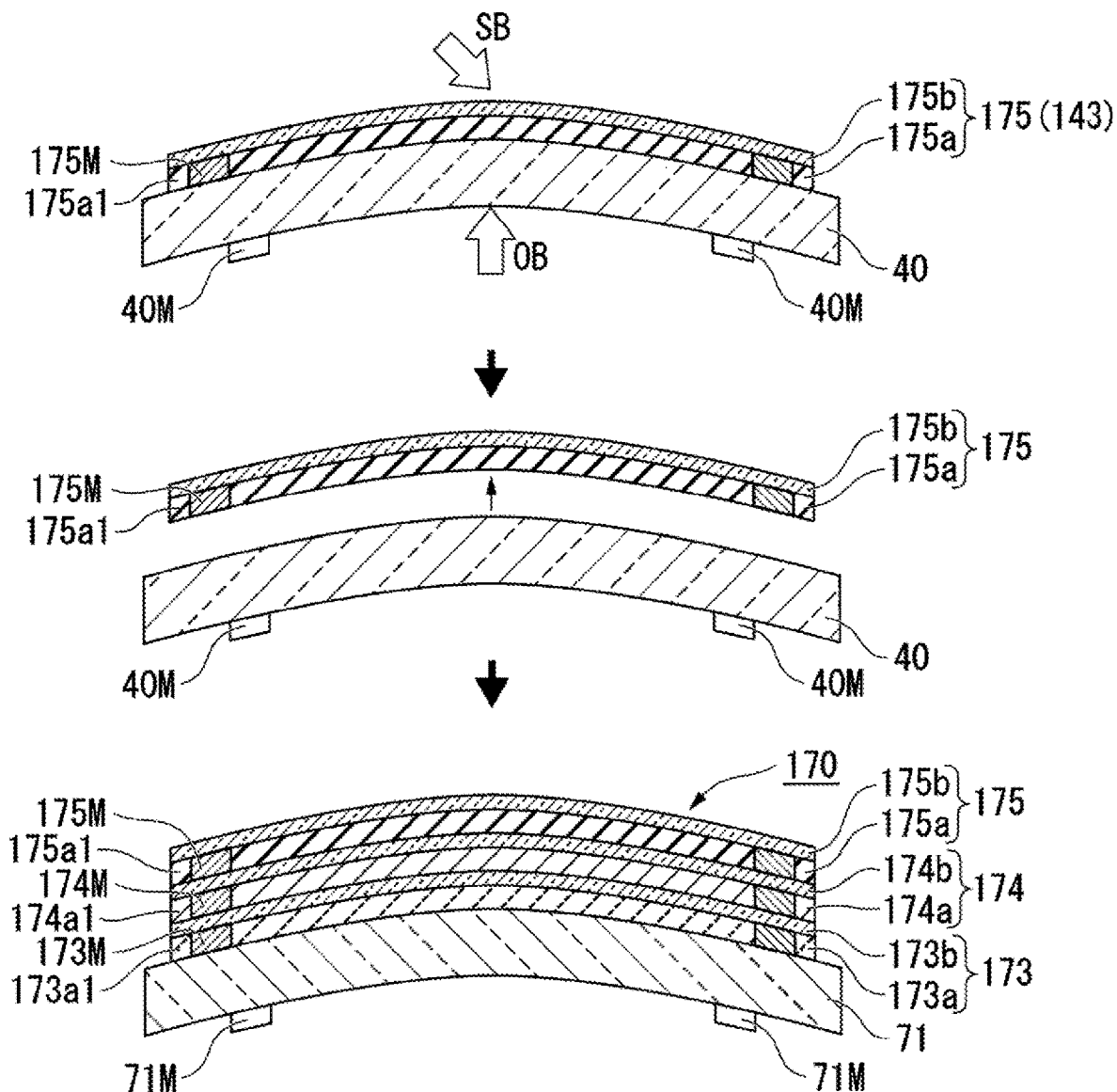
FIG. 13C is a diagram conceptually illustrating manufacturing steps of the second diffraction element in the second exemplary embodiment.

FIG. 13A to FIG. 13C are diagrams schematically illustrating manufacturing steps of the second diffraction element 170 in the present exemplary embodiment.

As illustrated in FIG. 13A, in the first step, a first hologram forming material 141 is affixed to the glass substrate 40. Thereafter, the reference light SB and the object light OB having a blue wavelength band are used to perform interference exposure for the first hologram forming material 141, to form the first hologram layer 173. The second alignment mark 173M is formed in the first hologram layer 173, together with the first interference fringes 173a1.

In the second step, the first hologram layer 173 formed by the interference exposure described above is peeled off from the glass substrate 40, and affixed to the plastic substrate 71 while being positioned. In the second step, the first alignment mark 71M formed in advance at the plastic substrate 71 and the second alignment mark 173M formed in the first hologram layer 173 during the interference exposure are used to position the plastic substrate 71 and the first hologram layer 173.

As illustrated in FIG. 13B, in the third step, a second hologram forming material 142 is affixed to the glass substrate 40. Thereafter, the reference light SB and the object light OB having a green wavelength band are used to perform interference exposure for the second hologram forming material 142, to form the second hologram layer 174. The third alignment mark 174M is formed in the second hologram layer 174, together with the second interference fringes 174a1.

In the fourth step, the second hologram layer 174 formed by the interference exposure described above is peeled off from the glass substrate 40, and affixed to the plastic substrate 71 while being positioned. In addition, in the fourth step, the first alignment mark 71M formed in advance at the plastic substrate 71 and the third alignment mark 174M formed in the second hologram layer 174 during the interference exposure are used to position the plastic substrate 71 and the second hologram layer 174. Note that, the second alignment mark 173M in the first hologram layer 173 affixed on the plastic substrate 71 and the third alignment mark 174M formed in the second hologram layer 174 may be used to position the second hologram layer 174 with respect to the plastic substrate 71.

As illustrated in FIG. 13C, in the fifth step, a third hologram forming material 143 is affixed to the glass substrate 40. Thereafter, the reference light SB and the object light OB having a red wavelength band are used to perform interference exposure for the third hologram forming material 143, to form the third hologram layer 175. The fourth alignment mark 175M is formed in the third hologram layer 175 together with the third interference fringes 175a1.

In the sixth step, the third hologram layer 175 formed by the interference exposure described above is peeled off from the glass substrate 40, and affixed to the plastic substrate 71 while being positioned. In the sixth step, the first alignment mark 71M formed in advance at the plastic substrate 71 and the fourth alignment mark 175M formed in the third hologram layer 175 during the interference exposure are used to position the plastic substrate 71 and the third hologram layer 175. Note that, the third alignment mark 174M formed in the second hologram layer 174 affixed to the first hologram layer 173 and the fourth alignment mark 175M formed in the third hologram layer 175 may be used to position the third hologram layer 175 with respect to the plastic substrate 71.

According to the steps described above, the first hologram layer 173, the second hologram layer 174, and the third hologram layer 175 are stacked and affixed in order on the plastic substrate 71, to manufacture the second diffraction element 170.

According to the method for manufacturing the second diffraction element 170 of the present exemplary embodiment, the glass substrate 40 that does not easily warp can be used as a supporting body for the first hologram forming material 141, to form the interference fringes precisely in the first hologram layer 173. Additionally, the first hologram layer 173 is precisely affixed to a predetermined position on the plastic substrate 71. In addition, similar effects can be obtained for the second hologram layer 174 and the third hologram layer 175. In other words, the interference fringes are precisely formed in the second hologram layer 174 and the third hologram layer 175, and the second hologram layer 174 and the third hologram layer 175 are precisely affixed to a predetermined position on the plastic substrate 71.

According to the second diffraction element 170 of the present exemplary embodiment, it is possible to provide a diffraction element, that includes the first interference fringes 173a1, the second interference fringes 174a1, and the third interference fringes 175a1 for which reduction in performance caused by warping of a supporting body during the interference exposure is suppressed, and includes the plastic substrate 71 as the supporting body, and thus is light and excellent in impact resistance, that is, tough against breakage, cracking, and the like.

In the second diffraction element 170 of the present exemplary embodiment, the case has been exemplified in which the first hologram layer 173, the second hologram layer 174, and the third hologram layer 175 are stacked and affixed on the plastic substrate 71, but the present disclosure can also be applied to a diffraction element having two-layer structure in which the first hologram layer 173 and the second hologram layer 174 are stacked on and affixed to the plastic substrate 71. In addition, the present disclosure can be applied to a diffraction element having four-layer structure in which, in addition to the first hologram layer 173, the second hologram layer 174, and the third hologram layer 175, a fourth hologram layer is stacked on the plastic substrate 71, or applied to a diffraction element having four or more layers.

Third Exemplary Embodiment

Next, an optical system according to a third exemplary embodiment will be described. In the second exemplary embodiment described above, the case has been exemplified in which the first hologram layer 173 to the third hologram layer 175 are individually formed at the glass substrate 40, and then stacked in order on the plastic substrate 71, but after a laminated body of the first hologram layer to the third hologram layer is formed at the glass substrate 40, the laminated body may also be affixed to the plastic substrate 71. Note that components common to the second exemplary embodiment will be given an identical reference numeral and detail description will be omitted.

In the present exemplary embodiment also, a configuration of a second diffraction element will be described as an example, but the same applies to a first diffraction element. A method for manufacturing the second diffraction element of the present exemplary embodiment includes a first step for forming a first hologram layer at a glass substrate, a second step for forming a second hologram layer at the first hologram layer, a third step for forming a third hologram layer at the second hologram layer, and a fourth step for affixing a laminated body of the first hologram layer, the second hologram layer, and the third hologram layer peeled off from the glass substrate to a plastic substrate.

Figure 14:
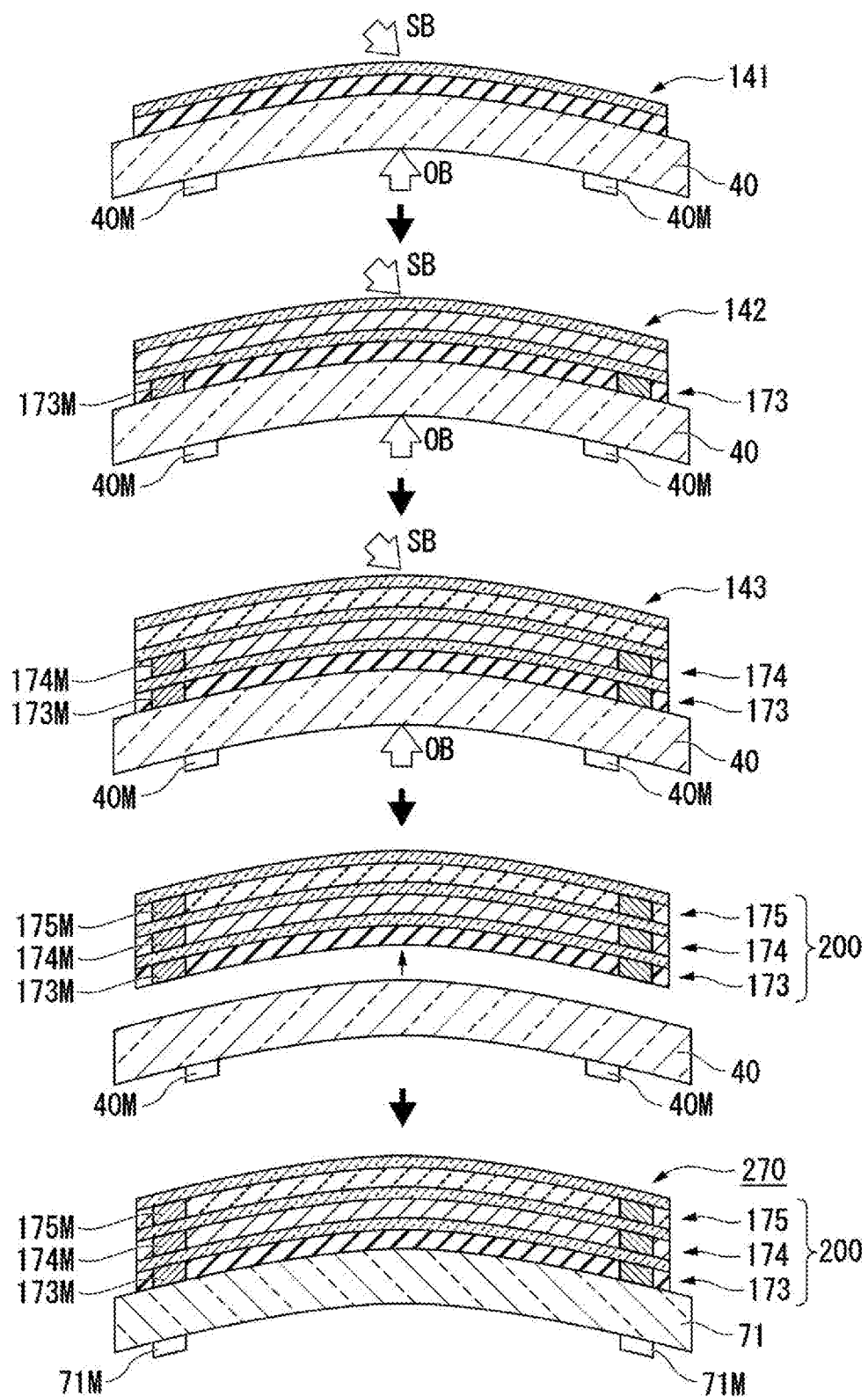
FIG. 14 is a diagram conceptually illustrating manufacturing steps of a second diffraction element in a third exemplary embodiment.

FIG. 14 is a diagram conceptually illustrating steps for manufacturing a second diffraction element 270 in the present exemplary embodiment. As illustrated in FIG. 14, in a first step, the first hologram forming material 141 is affixed to the glass substrate 40. Thereafter, the reference light SB and the object light OB having a blue wavelength band are used to perform interference exposure for the first hologram forming material 141, to form the first hologram layer 173. The second alignment mark 173M is formed in the first hologram layer 173. Note that, after the interference exposure, recorded fringes are fixed by performing UV irradiation, visible light irradiation, and heat treatment as necessary, and the hologram layer is decolorised.

Next, in a second step, the second hologram forming material 142 is affixed to the first hologram layer 173. Thereafter, the reference light SB and the object light OB having a green wavelength band are used to perform interference exposure for the second hologram forming material 142, to form the second hologram layer 174. The third alignment mark 174M is formed in the second hologram layer 174. Note that, after the interference exposure, recorded fringes are fixed by performing UV irradiation, visible light irradiation, and heat treatment as necessary, and the hologram layer is decolorised.

Next, in a third step, the third hologram forming material 143 is affixed to the second hologram layer 174. Thereafter, the reference light SB and the object light OB having a red wavelength band are used to perform interference exposure for the third hologram forming material 143, to form the third hologram layer 175. The fourth alignment mark 175M is formed in the third hologram layer 175. Note that, after the interference exposure, recorded fringes are fixed by performing UV irradiation, visible light irradiation, and heat treatment as necessary, and the hologram layer is decolorised.

A laminated body 200 of the first hologram layer 173, the second hologram layer 174, and the third hologram layer 175 is formed at the glass substrate 40 as described above. Note that, instead of performing the UV irradiation, visible light irradiation, and heat treatment as described above each time after forming the hologram layer, UV irradiation, visible light irradiation, and heat treatment may be performed for the laminated body 200 in a lump.

Next, in a fourth step, after the above-described laminated body 200 is peeled off from the glass substrate 40, the laminated body 200 is affixed to the plastic substrate 71. Also, in the fourth step, the first alignment mark 71M on the plastic substrate 71 and at least one of the second alignment mark 173M formed in the first hologram layer 173 in the first step, the third alignment mark 174M formed in the second hologram layer 174 in the second step, and the fourth alignment mark 175M formed in the third hologram layer 175 in the third step, are used to position the plastic substrate 71 and the laminated body 200.

According to the steps described above, the second diffraction element 270 is manufactured in which the laminated body 200 in which the first hologram layer 173, the second hologram layer 174, and the third hologram layer 175 are stacked is affixed to the plastic substrate 71.

According to the method for manufacturing the second diffraction element 270 of the present exemplary embodiment, since one step suffices for affixing to the plastic substrate 71, the steps for manufacturing the second diffraction element 270 can be shortened. In addition, it is sufficient that the affixing to the plastic substrate 71 where positioning accuracy is required is performed once, thus there is no need to consider stacked tolerance as in the case where each of the hologram layers 173, 174, and 175 is individually affixed to the plastic substrate 71. Thus, the first hologram layer 173, the second hologram layer 174, and the third hologram layer 175 can be precisely affixed to the plastic substrate 71.

The case has been exemplified in which in the second diffraction element 270 of the present exemplary embodiment, the laminated body 200 having the three layers including the first hologram layer 173, the second hologram layer 174, and the third hologram layer 175 is formed at the glass substrate 40, but the present disclosure is not limited thereto. For example, the present disclosure can be applied to a diffraction element having two-layer structure obtained by forming a laminated body having two layers including the first hologram layer 173 and the second hologram layer 174 at the glass substrate 40, peeling the laminated body having two-layer off from the glass substrate 40, and affixing the laminated body to the plastic substrate 71. In addition, the present disclosure can also be applied to a case where a laminated body having four layers is used in which in addition to the first hologram layer 173, the second hologram layer 174, and the third hologram layer 175, a fourth hologram layer is stacked on a glass substrate 40, or to a case where a laminated body having four or more layers is used.

Note that, the above-described exemplary embodiments are suitable exemplary embodiments of the present disclosure, and the present disclosure is not limited to the exemplary embodiments described above, and various modifications are possible within the scope that does not depart from the gist of the present disclosure. For example, while the exemplary embodiments described above have been described by way of example of the reflection-type volume holographic element, the present disclosure is also applicable to a transmissive-type volume holographic element.

In addition, in the exemplary embodiments described above, a convex shape has been exemplified as the marking portion 40M on the glass substrate 40, but a mark in a predetermined shape written using ink with a light shielding property on the inner surface 40a of the glass substrate 40 may be used as a marking portion. In addition, a marking portion may be formed by performing laser marking on the inner surface 40a of the glass substrate 40. When the laser marking is used, the marking portion is provided in a concave shape in the glass substrate 40. Note that, marking using ink with a light shielding property or using laser marking does not prevent affixing of the hologram forming material 41 to the glass substrate 40. Thus, marking using ink with a light shielding property or using laser marking may be performed for an affixing surface (outer surface 40b) of the hologram forming material 41 of the glass substrate 40.

In addition, the exemplary embodiments described above, the case has been exemplified in which the interference exposure is performed separately for one number of the hologram forming material 41 affixed to the glass substrate 40, but a plurality of hologram forming materials disposed on roll-shaped sheet may be sequentially transported onto a glass substrate, and exposure may be performed in a roll to roll manner in which each of the hologram forming materials supported on the glass substrate is separately exposed.

What is claimed is:

1. A method for manufacturing an optical element, comprising:
    a first step of performing, after affixing a hologram forming material to a glass substrate having a marking portion, interference exposure on the hologram forming material, thereby forming a hologram layer at the glass substrate; and
    a second step of affixing the hologram layer, peeled off from the glass substrate, to a plastic substrate having a first alignment mark, wherein
    the second step includes using the first alignment mark on the plastic substrate and a second alignment mark formed at a position corresponding to the marking portion in the hologram layer during the interference exposure to implement positioning of the plastic substrate and the hologram layer, and
    the first step includes affixing the hologram forming material to a second surface of the glass substrate opposite to a first surface thereof at which the marking portion is formed, by being pressed with a roller.

2. The method for manufacturing an optical element according to claim 1, wherein
    at the glass substrate, the marking portion is provided at a position, at which the second alignment mark is formed, outside an optically effective region in the hologram layer.

3. The method for manufacturing an optical element according to claim 1, wherein
    the second step includes using the plastic substrate at which the first alignment mark is disposed at a position in consideration of shift of an exposure position at the first alignment mark from the marking portion.

4. The method for manufacturing an optical element according to claim 1, wherein
    the second step includes bonding the plastic substrate and the hologram layer to each other via an adhesive.

5. The method for manufacturing an optical element according to claim 1, wherein
    the glass substrate and the plastic substrate each have a curved shape.

6. The method for manufacturing an optical element according to claim 1, wherein
    the first step includes using reference light and object light, which are composed of spherical waves, to perform the interference exposure on the hologram forming material.

7. The method for manufacturing an optical element according to claim 1, further comprising
    a third step of performing, after affixing a second hologram forming material to the glass substrate, interference exposure on the second hologram forming material, thereby forming a second hologram layer at the glass substrate; and
    a fourth step of overlapping and affixing the second hologram layer, peeled off from the glass substrate, to the first hologram layer affixed to the plastic substrate.

8. A method for manufacturing an optical element, comprising
    a first step of performing, after affixing a first hologram forming material to a glass substrate having a marking portion, interference exposure on the first hologram forming material, thereby forming a first hologram layer at the glass substrate;

a second step of performing, after affixing a second hologram forming material to the first hologram layer, interference exposure on the second hologram forming material, thereby forming a second hologram layer at the first hologram layer; and a third step of affixing a laminated body of the first hologram layer and the second hologram layer, peeled off from the glass substrate, to a plastic substrate having a first alignment mark, wherein the third step includes using the first alignment mark on the plastic substrate, and at least one of a second alignment mark formed at a position corresponding to the marking portion in the first hologram layer in the first step and a third alignment mark formed at a position corresponding to the marking portion in the second hologram layer in the second step to implement positioning of the plastic substrate and the laminated body.

* * * * *